United States Patent
Bellinger et al.

(10) Patent No.: US 11,092,704 B2
(45) Date of Patent: Aug. 17, 2021

(54) METHODS FOR MANUFACTURING LITHIUM FOIL NEUTRON DETECTORS

(71) Applicant: RADIATION DETECTION TECHNOLOGIES, INC., Manhattan, KS (US)

(72) Inventors: Steven Lawrence Bellinger, Manhattan, KS (US); Douglas Scott McGregor, Riley, KS (US); Benjamin William Montag, Wamego, KS (US); Logan Whitmore, Wamego, KS (US); Bryan Willis, Manhattan, KS (US)

(73) Assignee: Radiation Detection Technologies, Inc., Manhattan, KS (US)

( * ) Notice: Subject to any disclaimer, the term of this patent is extended or adjusted under 35 U.S.C. 154(b) by 1 day.

(21) Appl. No.: 16/682,816

(22) Filed: Nov. 13, 2019

(65) Prior Publication Data

US 2020/0150296 A1 May 14, 2020

Related U.S. Application Data

(60) Provisional application No. 62/760,108, filed on Nov. 13, 2018.

(51) Int. Cl.
*G01T 3/08* (2006.01)
(52) U.S. Cl.
CPC ...................................... *G01T 3/08* (2013.01)
(58) Field of Classification Search
CPC .......................................................... G01T 3/08
See application file for complete search history.

(56) References Cited

U.S. PATENT DOCUMENTS

| | | | |
|---|---|---|---|
| 4,272,680 A | 6/1981 | Cotic | |
| 4,365,159 A | 12/1982 | Young | |
| 4,481,421 A | 11/1984 | Young et al. | |
| 8,519,350 B2 | 8/2013 | McGregor et al. | |
| 9,817,138 B2 | 11/2017 | McGregor et al. | |
| 2002/0067789 A1 | 6/2002 | Wallace et al. | |
| 2012/0217406 A1* | 8/2012 | McGregor | G01T 3/00 250/361 R |
| 2014/0077091 A1* | 3/2014 | Ahlen | G01T 3/008 250/389 |

(Continued)

OTHER PUBLICATIONS

Dighe, P. M., and P. K. Mukhopadhyay. "Design and development of a wide range ion chamber for reactor instrumentation," Nuclear Instruments and Methods in Physics Research Section A: Accelerators, Spectrometers, Detectors and Associated Equipment 614.3 (2010): 449-452.

(Continued)

*Primary Examiner* — Hugh Maupin

(57) ABSTRACT

A system and method for making a neutron detector includes stacking anode frames and laminated frames to form a detector insert. The laminated frames are formed by laminating a foil of neutron-responsive material to an aluminum frame plated with a metal that does not react with the neutron-responsive material. The anode frames include an anode wire tensioned to a predetermined tension. The anode wires are electrically coupled to a top lid that includes an electrical connector and a gas feed through. The top lid is pressed into a tank with the detector insert.

27 Claims, 18 Drawing Sheets

(56) References Cited

U.S. PATENT DOCUMENTS

2017/0256378 A1\* 9/2017 Arai ................ H01J 47/06

OTHER PUBLICATIONS

Lowde, R. D. "The design of neutron counters using multiple detecting layers." Review of Scientific Instruments 21.10 (1950): 835-842.
McGregor, Douglas S., et al. "Design considerations for thin film coated semiconductor thermal neutron detectors-I: basics regarding alpha particle emitting neutron reactive films." Nuclear instruments and Methods in Physics Research Section A: Accelerators, Spectrometers, Detectors and Associated Equipment 500.1-3 (2003): 272-308.
Dighe, P. M., et al. "Boron-lined proportional counters with improved neutron sensitivity." Nuclear Instruments and Methods in Physics Research Section A: Accelerators, Spectrometers, Detectors and Associated Equipment 496.1 (2003): 154-161.
Alex, Mary, et al. "Development of a gamma compensated boron lined ionisation chamber for reactor safety and control applications." Nuclear Instruments and Methods in Physics Research Section A: Accelerators, Spectrometers, Detectors and Associated Equipment 580.3 (2007): 1395-1399.
Dighe, Priyamvada M. "New cathode design boron lined proportional counters for neutron area monitoring application." Nuclear Instruments and Methods in Physics Research Section A: Accelerators, Spectrometers, Detectors and Associated Equipment 575.3 (2007):461-465.
Knoll, Glenn F. Radiation detection and measurement. John Wiley & Sons, 2010.

\* cited by examiner

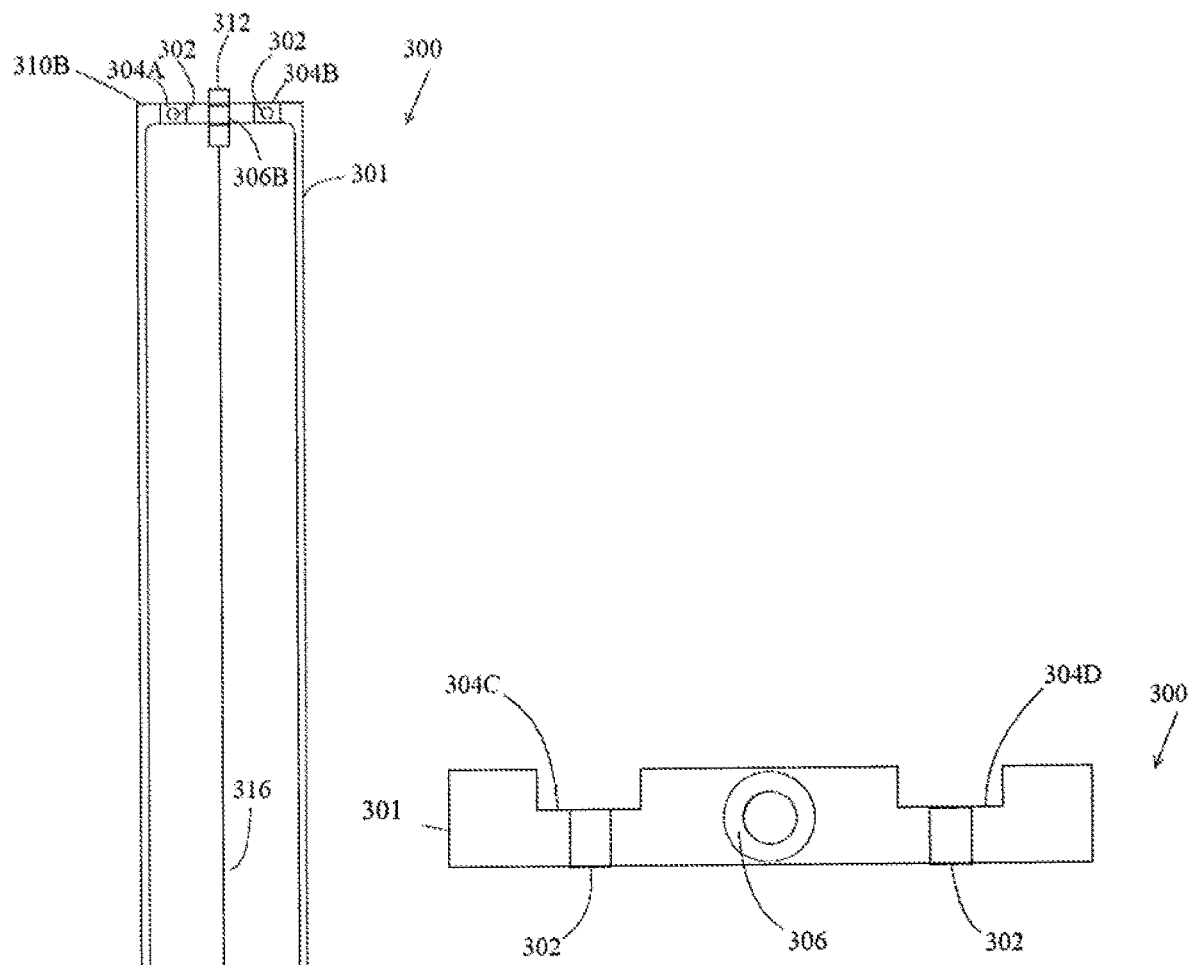
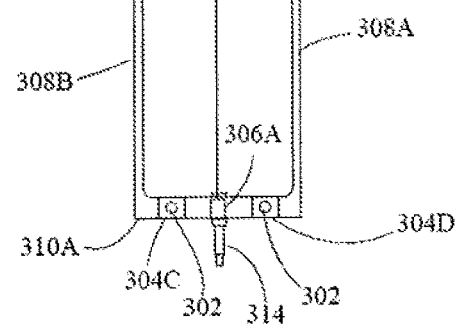
FIG. 17A
FIG. 17B

METHODS FOR MANUFACTURING LITHIUM FOIL NEUTRON DETECTORS

CROSS-REFERENCE TO RELATED APPLICATIONS

This application claims the benefit of U.S. provisional application Ser. No. 62/760,108 filed Nov. 13, 2018, the disclosure of which is hereby incorporated in its entirety by reference herein.

STATEMENT REGARDING FEDERALLY SPONSORED RESEARCH OR DEVELOPMENT

The invention was made with Government support under Contract No. HDTRA117C0059 awarded by the Defense Threat Reduction Agency. The Government has certain rights to the invention.

TECHNICAL FIELD

This invention relates to methods for manufacturing gas-filled radiation detectors, in particular to gas-filled radiation detectors designed to detect neutrons of various energy ranges in the form of large vessel with inserts composed of, or partially composed of, lithium-foil neutron absorbing materials.

BACKGROUND

Gas-Filled detectors are arranged in three various forms, those forms being ion chambers, proportional counters, and Geiger-Mueller counters. Of these basic forms, the proportional counter design is often used as the fundamental instrument for a gas-filled neutron detector. Proportional counters rely upon avalanche multiplication in the gas to produce large electronic signals, each signal being proportional to the energy deposited in the detector chamber. Quite differently, ion chambers do not produce avalanche multiplication and Geiger-Mueller counters produce excessive avalanching such that the electronic signal is no longer proportional to the energy deposited in the chamber. The technology taught in the present application is designed primarily for gas-filled proportional counters. The technology can be used in gas-filled ion chambers, proportional counters, and Geiger-Mueller counters.

Gas-filled proportional counters used for neutron detectors can be further subdivided into two types, those being detectors filled with a neutron reactive gas and those detectors that are coated with a neutron reactive material. Neutron interactions in either the neutron reactive gas or the neutron reactive coating eject energetic charged particles that create ionization in the detector gas. A voltage applied to the gas chamber causes the ions and electrons to move, and this ionization is subsequently measured as a current thereby indicating a neutron interaction occurred.

The most popular type of gas-filled neutron detector is the type filled with a neutron reactive gas. However, in recent times, these neutron reactive gases have been deemed hazardous, as is the case for $BF_3$, or have become rare and difficult to acquire, as is the case for $^3$He. The gas-filled neutron detector design with neutron reactive materials coating the walls does not suffer from these issues, yet these coated detectors have an intrinsic problem in that they are limited to relatively low neutron detection efficiency. The low detection efficiency is a direct result of the reaction products having a limited range in the coating, hence any coating thicker than particle ranges simply absorbs all of the particle energy, which is therefore not transferred to the detecting gas.

The converter films attached to gas-filled proportional counters most often used for neutron detection utilize either the $^6$Li(n,α)$^3$H reaction or the $^{10}$B(n,α)$^7$Li reactions. Due to low chemical reactivity, the most common materials used are pure $^{10}$B and $^6$LiF. Neutron reactive films based on the $^{157}$Gd(n,γ)$^{158}$Gd reaction show a higher neutron absorption efficiency than $^{10}$B(n,α)$^7$Li and $^6$Li(n,α)$^3$H-based films, however the combined emission of low energy gamma rays and conversion electrons from $^{157}$Gd(n,γ)$^{158}$Gd reactions make neutron-induced events difficult to discriminate from background gamma-ray events. As a result, Gd-based films are less attractive for devices where background gamma ray contamination is a problem. Alternatively, the particle energies emitted from the $^6$Li(n,α)$^3$H and the $^{10}$B(n,α)$^7$Li reactions are relatively large and produce signals easily discernable from background gamma ray noise. Thus far, thermal neutron detection efficiencies have been limited to only 4% for $^6$LiF and $^{10}$B single-coated devices. However, devices that utilize pure $^6$Li as the converter can have efficiencies as high as 13% for a single coated device. Unfortunately, pure Li decomposes rapidly in most circumstances, making a pure Li coated device impractical at present. As a result, the most commonly used neutron converter films are B and LiF, both of which are poor electrical conductors. There are some cases in which fissionable material, such as $^{235}$U, $^{238}$U and $^{232}$Th are used in gas-filled detectors, yet these same coatings are generally used for gas-filled ion chambers.

The $^{10}$B(n,α)$^7$Li reaction leads to the following reaction products:

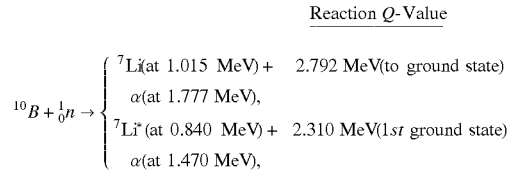

which are released in opposite directions when thermal neutrons (0.0259 eV) are absorbed by $^{10}$B. After absorption, 94% of the reactions leave the $^7$Li ion in its first excited state, which rapidly de-excites to the ground state (~10$^{-13}$ seconds) by releasing a 480 keV gamma ray. The remaining 6% of the reactions result in the $^7$Li ion dropping directly to its ground state. The microscopic thermal neutron absorption cross section is 3840 barns. Additionally, the microscopic thermal neutron absorption cross section decreases with increasing neutron energy, with a dependence proportional to the inverse of the neutron velocity (1/v) over much of the energy range.

The $^6$Li(n,α)$^3$H reaction leads to the following products:

Reaction Q-Value

4.78 MeV which again are oppositely directed if the neutron energy is sufficiently small. The microscopic thermal neutron (0.0259 eV) absorption cross section is 940 barns. The thermal neutron absorption cross section also demonstrates a 1/v dependence, except at a salient resonance above 100 keV, in which the absorption cross section surpasses that of $^{10}$B for energies between approximately 150 keV to 300 keV. Additional resonances characteristic to either isotope cause the absorption cross section to surpass one or the other as the neutron energy increases. Due to its higher absorption cross section, the $^{10}$B(n,α)$^7$Li reaction leads to a generally higher reaction probability than the $^6$Li(n,α)$^3$H reaction for neutron energies below 100 keV. However, the higher energy reaction products emitted from the $^6$Li(n,α)$^3$H reaction lead to greater ease of detection than the particles emitted from the $^{10}$B(n,α)$^7$Li reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions". The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the semiconductor detector, and ultimately limits the maximum film thickness that can be deposited over the semiconductor device. The measured voltage signal is directly proportional to the number of electron-hole pairs excited within the semiconductor. Reaction products that deposit most or all of their energy in the detector will produce much larger voltage signals than those reaction products that lose most of their energy before reaching the detector.

The energy absorbed in the detector is simply the original particle energy minus the combined energy lost in the boron film and the detector contact during transit. At any reaction location within the reactive film, a reduced energy will be retained by either particle that should enter the detector, being the maximum possible if the trajectory is orthogonal to the device contact. Hence, if the interaction occurs in the $^{10}$B film at a distance of 0.5 μm away from the detector, the maximum energy retained by the $^7$Li ion when it enters the detector will be 430 keV, and the maximum energy retained by the alpha particle will be 1150 keV. For the same interaction distance of 0.5 μm from the detector, the energy retained by the particle when it reaches the detector decreases as the angle increases from orthogonal (>0°). Given a predetermined minimum detection threshold (or LLD setting), the effective range (L) for either particle can be determined. For instance, an LLD setting of 300 keV yields $L_{Li}$ as 0.810 microns and $L_α$ as 2.648 microns. Similar conditions exist for $^6$LiF and $^6$Li films.

A commonly used geometry involves the use of a planar semiconductor detector over which a neutron reactive film has been deposited. Assuming that the neutron beam is perpendicular to the detector front contact, the sensitivity contribution for a reaction product species can be found by integrating the product of the neutron interaction probability and the fractional solid angle, defined by the reaction product effective ranges subtending the device interface, which yields:

$$S_p(D_F) = 0.5 F_p \left\{ \left(1 + \frac{1}{\Sigma_F L}\right)\left(1 - e^{-\Sigma_F D_F}\right) - \frac{D_F}{L} \right\} \text{ for } D \le L, \quad (1A)$$

and $$S_p(D_F) = 0.5 F_p e^{-\Sigma_F (D_F - L)} \left\{ \left(1 + \frac{1}{\Sigma_F L}\right)\left(1 - e^{-\Sigma_F L}\right) - 1 \right\} \text{ for } D_F > L, \quad (1B)$$

where $\Sigma_F$ is the macroscopic neutron absorption cross section, $D_F$ is the film thickness, and $F_p$ is the branching ratio of the reaction product emissions. The total sensitivity accordingly can be found by adding all of the reaction product sensitivities $$S(D_F)|_{Total} = \sum_{p=1}^{N} S_p(D_F), \quad (2)$$

where N is the number of different reaction product emissions. In the case of $^{10}$B-based films, N equals 4. Notice from equation 1B that the value of $S_p$ reduces as $D_F$ becomes larger than the value of L. As a result of this, there will be an optimum neutron reactive film thickness for front-irradiated detectors. Since the minimum particle detection threshold determines the effective range (L), the optimum film thickness is also a function of the LLD setting. With the LLD set at 300 keV, the maximum achievable thermal neutron detection efficiency is 3.95%. The thermal neutron detection efficiency can be increased to 4.8% by lowering the LLD setting, but only at the expense of accepting more system noise and gamma-ray background interference. Similar cases exist for $^6$LiF and pure $^6$Li films. Using an LLD setting of 300 keV, obverse detector irradiation yields maximum thermal neutron detection efficiencies of 4.3% for $^6$LiF-coated devices and 11.6% for pure $^6$Li-coated devices.

Design of Conventional $^{10}$B and $^6$Li Coated Gas-Filled Proportional Detectors In 1908, Ernest Rutherford and Hans Geiger constructed a device composed of a metallic cylinder with a thin wire arranged axially inside. The gas medium in the device was simply air. With the application of a voltage, alpha particles projected into the device produced sizable currents as measured with an electrometer. Rutherford and Geiger had devised the first radiation counter. They also noticed that the behavior of the detector changed with increasing voltage, mainly that alpha particles could be detected at much lower applied voltages than beta particles, a technique and application that later became known as proportional counting. Experiments conducted with the gas-filled detectors clearly showed distinctive regions of operation, as shown in FIG. 1

The principle behind a gas-filled detector is quite simple. Radiation interactions in the gas or ejected particles from radiation interactions in the chamber walls cause the detector gas to become ionized, and a charge cloud composed of electrons and positive ions appears. A voltage placed across electrodes in the gas chamber causes the electrons and ions to drift apart, where electrons drift towards the anode and the positive ions drift towards the cathode. As the charged particles, or charge carriers, move through the chamber, they induce current to flow in a circuit externally connected to the chamber. This current, or change in current, can then be measured as an indication that a radiation interaction occurred in the chamber.

General Operation

Gas detectors can be operated in pulse mode or current mode. Pulse mode is generally used in low to moderate radiation fields. In such a case, a single radiation quantum, such as an alpha particle, beta particle or gamma ray, interacts in the chamber volume, giving rise to an ionized cloud. The charge carriers drift apart, and as they induce current to flow to the device terminals, a charging circuit, usually consisting of a preamplifier and feedback loop, integrates the current and stores the charge, thereby producing a voltage potential. This voltage is measured as a single event, indicating that a single radiation quantum has been detected. The preamplifier circuit is subsequently discharged and reset, allowing the device to measure the next radiation interaction event. Hence, each voltage pulse from the detector indicates an individual radiation interaction event. Although extremely useful, there are drawbacks to this method. Should another radiation interaction occur while the detector is integrating or discharging the current from a previous interaction event, the device may not, and usually does not, record the new interaction, a condition referred to as pulse pile up. The time duration in which a new pulse cannot be recorded is the detector recovery time, sometimes referred to as dead time. A pulse mode detector operated in low radiation fields has little problem with dead time count losses; however, a detector operated in high radiation fields may have significant dead time losses, thereby yielding an incorrect measurement of the radiation activity in the vicinity.

For high radiation fields, gas detectors are operated in current mode, in which the radiation induced current is measured on a current meter. Under such conditions, many interactions can occur in the device in short periods of time, and the current observed increases with total radiation exposure rate. Hence, current mode can be used to measure high radiation fields, with the magnitude of the current being a measure of the radiation induced ionization rate in the detector, thereby giving a measure of the radiation field in which the device is being operated. The disadvantage of current mode is that it does not identify individual radiation interactions.

FIG. 2 illustrates a gas-filled detector similar to that first explored by Geiger and Rutherford. The detector is exposed to directly ionizing radiation, which would include α-particles and β-particles. Either of these particles can cause ionization in the gas-filled device, thereby, producing electron-ion pairs. Hence, there are both an absorber and an observable, so that to produce a radiation detector only a method is needed to measure the amount of ionization. Suppose the device is connected to a simple electrometer so as to measure the current produced by the motion of the electron-ion pairs. Without an applied voltage, the electron-ion pairs diffuse randomly in all directions and eventually recombine. As a result, the net current from the electrometer is zero. Now apply a positive voltage to the thin wire of the device, or anode, so that the free electrons (negative charge) drift towards the anode and the free ions (positive charge) drift towards the detector wall. At low voltages, some measurable current is seen, yet considerable recombination still occurs, which is the recombination region identified as Region I in FIG. 1. As the voltage is increased, electron-ion pair separation becomes more efficient until practically no recombination occurs. Hence, the current measured is a measure of the total number of electron-ion pairs formed, which is Region II of FIG. 1, and is referred to as the ionization chamber region.

As the voltage is increased further, the electrons gain enough kinetic energy to create more electron-ion pairs through impact ionization. This provides a mechanism for signal gain, often referred to as gas multiplication. As a result, the observed current increases as the voltage increases, but is still proportional to the energy of the original radiation particle. This multiplication occurs in Region IIIa, the proportional region. Increasing the applied voltage further causes disproportional current increases to form, marked in FIG. 1 as Region IIIb, beyond which, in Region IV, all currents, regardless of origin, radiation species or energies, are the same magnitude. Region IV is the Geiger-Mueller region. Finally, excessive voltage drives the detector into Region V where the voltage causes sporadic arcing and other spontaneous electron emissions to occur, hence causing continuous discharging in the detector. Gas detectors should not be operated in the continuous discharge region. In the following subsections, detector operation in Regions II, III, and IV is described in more detail.

Operation of Ion Chambers

The simplest gas-filled detector is the ion chamber. There are many configurations of ion chambers, and they are operated in Region II of the gas curve shown in FIG. 1. The detection method is simple. Ionizing radiation, such as alpha or beta particles, or gamma or x rays, enter into a region filled with a gas such as Ar or air. The chamber has electrodes across which a voltage is applied. When radiation interactions occur in the gas, they cause the gas to become ionized, which produces electron-ion pairs relative in number to the radiation energy absorbed. The voltage applied across the electrodes causes the negative electrons to separate from the positive ions and drift across the chamber volume. Electrons drift towards the anode and positive ions drift towards the cathode, and their movement induces current to flow in the external circuit. Typically, this induced current is sensed by either directly measuring the current or by storing the charge in a capacitor and measuring the resulting voltage.

The first case is referred to as current mode operation and the second case is pulse mode operation. Current mode operation is used in high radiation fields, and the magnitude of the current measured gives a measure of the intensity of the radiation field. Pulse mode is used for lower radiation fields, and allows for each individual radiation interaction in the chamber to be counted. Ion chambers come in many forms, and can be used for reactor power measurements, where the radiation field is very high, or as small personnel dosimeters, for use where radiation levels are typically low. Although simple in concept, two main problems occur in the ion chamber for pulse mode operation, those being (1) the signal measured is small, due to the fact that the current measured is only from the primary (or initial) electron-ion pairs excited by the radiation quantum and (2) the signal formation time can be long due to the slow motion of the heavy positive ions. Often, an RC circuit is connected to an ion chamber to reduce the time constant of the system and discharge the capacitor before all of the ions are collected, thereby reducing the time response.

Operation of Neutron-Sensitive Ion Chambers

If an ion chamber is coated with a strongly-absorbing neutron-reactive material or filled with a neutron reactive gas, such that ionizing particles are released from the neutron reactions, it can be used as a neutron detector. Commonly used isotopes for neutron detectors are $^3$He, $^{10}$B, $^6$Li, and $^{235}$U. Neutron sensitive ion chambers are usually filled with $^{10}$BF$_3$ or $^3$He gas, or the inside walls of the chamber are coated with $^{10}$B, $^6$LiF, or $^{235}$U. These gas-filled neutron detectors can be operated as ion chambers or proportional counters.

Ion chambers that use $^{231}$U are often referred to as fission chambers, since it is the fission fragments from the $^{235}$U that ionize the chamber gas. Fission chambers are often used where there is a mixed radiation field containing a large component of gamma rays. Fission fragments can deposit as much as 50 times the energy as gamma rays in a fission chamber. Hence, when operated in pulse mode, the voltage pulses formed by fission fragments are much larger than gamma-ray pulses, thereby, making it possible to discriminate between the two radiations. Due to problems with pulse pile up, ion chambers and fission chambers are generally not operated in pulse mode when in high radiation fields, although some special pulse mode designs incorporating $^{235}$U are used for in-core nuclear reactor monitoring.

Proportional Counters

Observe in FIG. 1 that Region III is separated into subregions, namely, Region IIIa (proportional) and Region IIIb (limited proportionality). Proportional counters are operated in region IIIa of the gas curve, in which an electronic pulse produced by ions moving through the detector is proportional to the original energy absorbed in the detector by a quantum of radiation, be they charged particles, neutrons, gamma rays or x rays. Although the gas-flow proportional counter was invented in 1943 by John Simpson, the actual effect of pulse height proportionality was known from those initial experiments conducted by Rutherford and Geiger with their gas-filled chambers. Ar is the most commonly used gas in a proportional counter, although there are many other gases that can be used, which include $^3$He, Xe, and $^{10}$BF$_3$.

As with the ion chamber, a quantum of radiation can interact in the device's volume, either with the gas or with the chamber walls. If, for instance, a gamma ray interacts with the chamber wall, an energetic electron can be ejected into the gas volume, which then produces a cloud of electron-ion pairs. If the gamma ray interacts directly with the gas, then the primary energetic electron again produces a cloud of electron-ion pairs. In either case, a cloud of electron-ion pairs is formed in which the total number of ion pairs produced is proportional to the radiation energy deposited in the detector. Hence, by measuring the number of ion pairs formed, the energy deposited in the gas volume by the interacting radiation quantum can be determined. This measurement can be performed by applying a voltage across the detector and measuring the current produced as the electrons and ions drift through the chamber volume. Yet, as explained with the ion chamber, such a current can be minuscule and hard to measure.

At high enough voltages, electrons can gain enough kinetic energy to cause more ionization and excitation in the gas, an effect called impact ionization. These newly liberated electrons gain enough energy from the electric field to cause even more ionization. The process continues until the electrons are collected at the anode. The entire process of generating the impact ionization cloud is called a Townsend avalanche, or sometimes gas multiplication, as illustrated in FIG. 3. There is a critical electric field $E_A$ at which gas multiplication begins and below which the electrons do not gain sufficient energy to cause impact ionization. This threshold electric field defines the difference between Region II and Region III in the gas curve.

Parallel plate detector configurations may work for ion chambers, but are seldom used for proportional counters. A preferred geometry is a coaxial configuration, as depicted in FIGS. 2 and 4. To understand why, compare the difference in electric fields between coaxial and parallel plate geometries, as shown below.

Consider the parallel plate detector configuration shown in FIG. 4. If the voltage is $V_o$ at $x=x_1$ and zero (grounded) at $x=x_2$, then it can be shown that the electric field is $$E(x) = \frac{V_o}{x_2 - x_1} = \frac{V_o}{W}, \quad (3)$$

where W is the width between the parallel contacts. Notice that the electric field for the planar configuration is constant, hence a relatively large voltage is required to reach the critical avalanching field $E_A$.

Now consider the coaxial case also shown in FIG. 4. It can be shown that, for a voltage $V_o$ applied to the inner anode with the outer surface at ground potential, the electric field at radial distance r is $$E(r) = \frac{V_o}{r\ln(a/b)}, \quad (4)$$

where a is the radius of the inner anode and b is the radius of the cathode shell wall. Unlike the planar case, the electric field is not constant for the coaxial case, and the highest electric field occurs at r=a.

Suppose the distance between b and a in the cylindrical case is the same as the distance between $x_2$ and $x_1$ in the planar, i.e., $b-a=x_2-x_1=W$. Now assume that highest value of the electric field in both cases just reaches the critical electric field $E_A$ such that $$E_A = \frac{V_o^{cylindrical}}{a\ln(b/a)} = \frac{V_o^{planar}}{W}, \quad (5)$$

which, upon rearrangement, yields $$\frac{V_o^{planar}}{V_o^{cylindrical}} = \frac{W}{a\ln(a/b)}. \quad (6)$$

If a<<b, then W=b−a≈b, so that the above result becomes $$\frac{V_o^{planar}}{V_o^{cylindrical}} \approx \frac{b/a}{\ln(b/a)} > 1 \quad (7)$$

Because a<<b, for similar chamber dimensions, it is seen that the voltage needed to reach $E_A$ for the planar device is always greater than that needed for the cylindrical device.

Atomic electrons elevated in energy through impact ionization can also generate additional free electrons. The excited atoms de-excite by the emission of ultraviolet (UV) light which, in turn, can remove loosely bound electrons from other atoms through the process known as photoionization. Such electrons from photoionization can cause problems. To understand this, let δ be the probability that a secondary electron produces a tertiary electron as a result of UV photoionization. If f is the gas multiplication from the initial avalanche, the overall multiplication from successive avalanches caused by the UV produced photoionization electrons is $$M = f + \delta f^2 + \delta^2 f^3 + \ldots + \delta^{n-1} f^n = \sum_{i=1}^{n} \delta^{i-1} f^i, \quad (8)$$

where i represents the consecutive avalanche waves (first, second, third, and so on) up to the final avalanche n. The quantity $\delta f$ is strongly dependent upon the applied operating voltage. If $\delta f<1$ the series in Eq. 8 reduces to $$M = \frac{f}{1 - \delta f}. \quad (9)$$

If, however, $\delta f>1$, the avalanching process becomes uncontrollable and the detector develops a self-sustaining discharge. This may occur when too high a voltage is applied (as in Region V of FIG. 1). Continuous waves of avalanches can occur if UV light released by the excited electrons ionize too many Ar atoms, and if the Ar atoms, when arriving at the cathode wall, strike with enough kinetic energy to cause the ejection of more electrons, as depicted in FIG. 5a. To prevent continuous waves of avalanching from occurring in the chamber after a radiation interaction, a quenching gas is added to the gas mixture, typically a polyorganic molecule. A common proportional counter gas is P-10, which is a mixture of 90% Ar and 10% methane (the quenching gas). When an ionizing particle enters the detector, it ionizes both the Ar and the quenching gas. However, as the Ar gas ions drift through the chamber, they transfer their charge to the quench gas molecules, which then continue to drift and carry the positive charge to the cathode wall. When a quench gas is struck by a UV photon or strikes the cathode wall, it dissociates by releasing a hydrogen atom rather than ejecting an electron, as shown in FIG. 5b. As a result, the quench gas prevents continuous waves of avalanches.

Multiwire Proportional Counter

Multiwire proportional counters, developed in 1968 by Charpak, are similar to single wire devices, except that they use a criss-cross array of wires. Typically, there are two planar arrays of parallel cathode wires with the arrays positioned orthogonal to each other. One might consider one set of wires parallel to the x direction and the other set parallel to the y direction. In between the two cathode wire array planes is a parallel planar array of anode wires, which are typically arranged at a 45° angle to the cathode wires (see FIG. 6). As with the simple proportional counter, ionizing radiation produces primary electron-ion pairs in the detector gas. Electrons travel towards the nearest anode wires in the array, which then produce a Townsend avalanche of electron-ion pairs. The cloud of positive ions separate and travel towards the nearest cathode wires in the planes on both sides of the anodes. Hence, the position of the event is determined by which cathode wires deliver a signal on the x-y plane. Overall, the multiwire proportional counter can provide both energy information and position information of the ionizing event. Charpak was awarded the 1992 Nobel Prize in Physics for his invention of the multi-wire proportional chamber.

Neutron-Sensitive Proportional Counters

As with the ion chamber, proportional counters that are either coated with a strongly absorbing neutron reactive material or are filled with a neutron reactive gas can be used as neutron detectors. The most commonly used materials for proportional counter neutron detectors are the gases $^3$He and $^{10}BF_3$, and the solid $^{10}B$. Although neutron sensitive, neither $^{10}BF_3$ nor $^3$He are ideal proportional gases, but they perform adequately well. Because the device operates in proportional mode, a low resolution spectrum associated with the reaction product energies of the $^{10}B(n,\alpha)^7Li$ reactions or the $^3He(n,p)^3H$ reactions can be identified, depending on the gas used in the counter. This prior art type of gas-filled neutron detector is depicted in FIGS. 8 and 9.

Shown in FIG. 8 is a prior art gas flow detector in which a neutron reactive gas 6 is constantly purged through the detector chamber composed of cathode walls 1 and lid 2. Voltage is applied to the electrodes 5, typically operated as the anodes. A neutron 8 enters the detector through a thin membrane 7 into the reactive gas 6 as is absorbed. The reaction results in the instantaneous emission of reaction products 9 which cause ionization 11 in the gas 6. The electrons are drawn towards the anodes 5, which cause a Townsend avalanche and voltage output pulse.

Shown in FIG. 9 is a prior art gas flow detector in which a neutron reactive gas 6 is sealed in detector chamber composed of a cylindrical cathode 1. Voltage is applied to the electrode 5, typically operated as the anode. A neutron 8 enters the detector through the cathode wall 1 into the reactive gas 6 and is absorbed. The reaction results in the instantaneous emission of reaction products 9 which cause ionization 11 in the gas 6. The electrons are drawn towards the anode 5, which cause a Townsend avalanche and voltage output pulse.

The neutron detection efficiency can be increased by increasing the gas pressure of the counter, hence providing more neutron absorber. Typical pressures range from 1 atm to 10 atm. Electron and ion velocities decrease inversely proportional to gas pressure: consequently, increasing the gas pressure in the tube causes the counter dead time to increase. Gas-filled tubes come in a variety of sizes, ranging from small chambers only a few cm long and one cm in diameter to large chambers several feet long and several inches in diameter.

Unfortunately, $^3$He is relatively rare gas that has become expensive in recent times, thereby driving up the cost of these gas-filled detectors. Further, $^{10}BF_3$ is a poisonous gas and does have certain health risks associated with their production, use and disposal.

A better proportional gas such as P-10, a gas that is non-reactive with neutrons, may be used in the chamber if, instead of filling the chamber with a neutron reactive gas, the walls are coated with $^{10}B$. Unfortunately, the spectral features from such a device are harder to interpret due to interference from background gamma rays, and the total neutron detection efficiency is limited by the thinness of the optimum $^{10}B$ absorber coating, typically only 2 to 3 microns thick. The detectors can be made more efficient by increasing the diameter, or by inserting additional $^{10}B$-coated plates in the chamber.

Shown in FIG. 10 is a common design for a coated proportional counter used for neutron detection, in which a neutron reactive coating 12 is on the cathode wall 1. The detector is filled with a gas 13 generally not reactive with neutrons. Neutrons are absorbed in the reactive coating 12 which results in the emission of ionizing reaction products 9. Due to the geometry, and the fact that the reaction products are emitted in opposite directions, only one of the reaction products 9 can enter the detector gas. The result is a decreased amount of energy deposited in the detector than the total Q value of the reaction, resulting in less ionization 11. Further, due to self-absorption of energy as the reaction product travels through the neutron absorbing film to the detector gas, more energy can be lost, a significant problem with this type of detector. Further, the total overall efficiency that can be achieved with the design is less than 10% detection of thermal neutrons.

Referring now to FIGS. 11 and 12, show is prior art where metal washers 30 have been inserted down the axis of a cylindrical gas-filled detector. The washers 30 are separated by spacers 31 and the washers 30 are coated on both sides with a neutron reactive material 12. Although the design increases the overall efficiency of the detector, it has a limit to the efficiency that can be realized. Further, the detector of FIGS. 11 and 12 is designed to point, end to end, at the neutron source. Because of the geometry of the detector of FIGS. 11 and 12, neutrons will not be detected effectively if the detector is irradiated from the side, which is the preferred method of operating gas-filled neutron detectors. A practical device will be limited to less than 35% detection efficiency of thermal neutrons if the device is irradiated end on, reducing to almost 0% if irradiated from the side. As with the detector of FIG. 10, only one reactive product can enter the gas chamber because the other reaction product enters the metal washer 30.

Geiger-Mueller Counters

Although Hans Geiger originally created the gas-filled detector in 1908 (with Ernest Rutherford), the device used today is based on an improved version that his first PhD student, Walther Mueller, constructed in 1928. Hence, the proper name for the device is the "Geiger-Mueller" counter. The original "Geiger" counter was sensitive to alpha particles, but not so much to other forms of ionizing radiation. Mueller's improvements included the implementation of vacuum tube technology, which allowed for the device to be formed into a compact and portable tube sensitive to alpha, beta and gamma radiation. In 1947, Sidney Liebson further improved the device by substituting a halogen as the quenching gas, which allowed the detector to operate at lower applied voltages while lasting a significantly longer time. Geiger counters are typically arranged in a coaxial configuration, in which a thin anode wire is projected inside a tube that serves as the cathode. A high voltage is applied to the central anode wire, while the cathode is held at ground, as shown in FIG. 2.

Geiger-Mueller counters are operated in Region IV of the gas counter curve. The device depends upon gas multiplication as a signal amplification mechanism, much like the proportional counter, however a single important difference is that, at any specific applied voltage, all output pulses from a Geiger-Mueller counter are of the same magnitude regardless of the ionizing radiation energy or type. Hence, Geiger-Mueller counters do not intrinsically possess the ability to discern between alpha, beta, or gamma radiation, nor can they distinguish between different energies of these radiations.

When an ionizing particle enters a Geiger-Mueller counter, the counting gas becomes ionized creating a small cloud of electron-ion pairs (depicted in FIG. 7(1)). Because a high voltage is applied to the anode, the device operates in region IV of the gas curve. The electrons drift rapidly to the anode while the ions slowly drift towards the cathode, as shown in FIG. 7(2). When the electrons enter into the high electric field near the anode above the critical field $E_A$ needed to produce avalanche ionization, they gain enough kinetic energy to produce more electron-ion pairs through impact ionization, and a large and dense cloud of electron-ion pairs is formed. In addition, impact ionizations excite electrons in some gas atoms which emit UV photons when they de-excite and produce more ionization through photoionization. This large accumulation of positive ions near the anode affects the electric field and reduces its strength. These processes are depicted in FIG. 7 (3) and (4). There is a point at which the large accumulation of space charge around the anode increases so much that the electric field is reduced below the critical field strength $E_A$ needed to sustain avalanching; hence, impact ionization ceases, as shown in FIG. 7(5). The positive ions drift to the cathode, which produces the output pulse for the detector. As they move towards the cathode, the electric field near the anode recovers to full strength once again, and the detector is now set to detect the next radiation interaction event, as depicted by FIG. 7(6).

A few matters should be noted: (a) the electric field in the detector increases with an increase in applied voltage; (b) the Geiger-Mueller discharge ceases when the electric field is reduced below $E_A$ at the anode and, therefore, the positive ion accumulation density must increase with applied operating voltage to stop the avalanche; (c) to prevent more electrons from being ejected when the ions strike the cathode, a quenching gas must be used just as with the proportional counter; and (d) the entire Geiger discharge process is slower than that of a proportional counter, mainly because of the time required to produce the dense cloud of positive ions. Hence, the size of the output pulse is determined by how much space charge must accumulate to reduce the electric field below $E_A$ and not the energy deposited within the detector. As a result, the pulse height for various energies of α-particles, β-particles, and γ-rays are all the same, within statistical variation, and the output pulse height is predetermined by the applied operating voltage. Dead times for Geiger-Mueller counters can be on the order of 10 times longer than those of proportional counters of similar size. Lastly, because Geiger-Mueller counters are typically closed tubes, the quenching gas inside can be exhausted over time if traditional organic molecules such as the methane component of P-10 gas are used. Instead, Geiger-Mueller counters use halogens for a quenching gas, in which the diatomic molecules dissociate when they strike the cathode. Halogens, unlike methane, can heal themselves by recombining into diatomic molecules, thereby extending the life of the gas in the detector.

Considering equations 1 and 2, gas-filled detectors relying upon neutron reactive coatings are limited to low efficiencies due to reaction product self-absorption. Neutrons impinging upon a cylindrical gas-filled detector with a coating on the inner tube surface must first cross the coating before entering into the detector gas, and those not absorbed must again cross the coating while exiting the device. As a result, the maximum efficiency that the device can have will be limited to less than 10% thermal neutron detection efficiency. Detectors with washers coated with neutron reactive material aligned down the axis of a detector can increase the neutron detection efficiency, but are ineffective when irradiated from the side and are designed to point end on at the neutron source.

Described in the following application disclosure is a method to increase the thermal neutron detection efficiency of a gas-filled neutron detector.

SUMMARY

The above-mentioned and other problems become solved by applying the principles and teachings associated with the hereinafter described lithium foil gas-filled neutron detectors. A gas-filled detector is designed such that large surface areas are incorporated into a gas-filled detector, where these surfaces are coated with lithium neutron reactive material, or the surfaces are composed, at least partially, of lithium neutron reactive material. The surfaces may be flat or curved fins or plates. The incorporation of the extended surfaces coated with or composed of neutron reactive material increases the neutron detection efficiency of the gas-filled detectors over conventional coated designs.

These surfaces increase the amount of neutron reactive material present in the detector over conventional coated designs and as a result increase the neutron detection efficiency. The lithium-foil surfaces can be made of or comprised of conducting, semiconducting or insulating materials. The surfaces are arranged such that they do not detrimentally detract from the main function of a gas-filled detector with particular attention to gas-filled proportional detectors.

An object of the present invention is to provide manufacturing methods for neutron detectors that have detection efficiencies many times greater than present coated gas-filled neutron detectors while remaining relatively inexpensive to construct.

Another object of the present invention is to provide a neutron detector than does not need to use $^{10}BF_3$ or $^3He$ gases and operates on common proportional gases such as Ar and P-10.

Another object of the invention is to provide a method to construct gas-filled neutron detectors with solid source neutron absorbers instead of neutron reactive gases, where the solid source neutron absorbers allow for all reaction products to enter the non-reactive detector gas.

In carrying out of the above objects and other objects of the present invention, a manufacturing method for detectors that efficiently detect neutrons is provided. The manufacturing method includes providing a cavity in which a gas is contained. Inside the cavity a plurality of surfaces composed of lithium neutron reactive materials, lithium-coated with neutron reactive materials, or a combination of both are placed. The objects are responsive to neutrons by absorbing the neutrons and releasing ionizing radiation reaction products. The abundance of neutron reactive objects inside the detector cavity increases the probability of absorbing the neutrons and releasing ionizing reaction products into the detector gas. Inside the cavity are electrodes that serve as anodes and cathodes, though which a high voltage is applied.

The gas-filled cavity may be coated with a neutron reactive material. The reactive materials may include elemental, enriched or compound forms of lithium. The surfaces may be composed of neutron reactive materials that allow all reaction products to escape into the detector gas. The neutrons may be thermal neutrons. The electrodes for the compartments may be arranged and connected to operate as a single detector.

The gas-filled compartments may be coated with a neutron reactive material. The lithium neutron reactive material may be comprised of insulating or semi-insulating materials to ensure that they do not disrupt the electric field inside the detector cavity. The lithium neutron reactive material may be arranged geometrically to reduce or prevent neutron streaming through the detector cavity.

The above object and other objects, features and advantages of the present invention are readily apparent from the following detailed description of the best mode for carrying out the invention when taken in connection with the accompanying drawings.

Described and taught in the following application is a method to manufacture lithium-foil based gas-filled neutron detectors by the insertion of multiple extended surfaces coated with neutron reactive material, with specialized anode banks and hermetic sealing of the gas chamber.

A method of making a neutron detector includes laminating a foil of neutron-responsive material to a plated aluminum frame that defines a plurality of windows such that foil is exposed on both sides of the plated aluminum frame to form a laminated frame assembly for placement into a gas-filled radiation detector The plated aluminum frame is plated with a metal that does not react with the neutron-responsive material.

The neutron-responsive material may be lithium. The metal may be one of nickel, gold, platinum, palladium, silver, tin, and copper. The laminating may be performed in an environment having Dew point less than minus 40° C. The foil may include a plastic covering on one side of the foil, and the step of laminating may include inserting a first layer of Teflon adjacent the plated aluminum frame and a second layer of Teflon adjacent the plastic covering. The laminating may be performed at a temperature between 50° C. and 120° C.

An apparatus for detecting neutrons includes a detector housing defining a chamber to retain a detector gas. The apparatus further includes a plurality of laminated frames comprising a plated aluminum frame defining a plurality of windows to which a foil of neutron-responsive material is laminated. The plated aluminum frame may be plated with a metal that does not react with the neutron-responsive material The apparatus further includes a plurality of plated anode frames, each including an anode wire that is coupled to a first electrically-insulated retaining element at a first side of the plated anode frame and spans across to a second side of the plated anode frame and through a second electrically-insulated retaining element. The apparatus further includes a detector insert formed by arranging the plated anode frames and the laminated frames in an alternating stack and inserted into the chamber of the detector housing. The apparatus further includes a cover having tapered sides and pressed into an open end defined by the detector housing. The apparatus further includes an electrical connector coupled to the cover and having a first connection to which each anode wire is electrically connected. The apparatus further includes a tube passing through an opening defined in the cover and configured to be pinched off for sealing after inserting the detector gas through the tube.

The apparatus may further include a layer of low outgassing epoxy installed at an interface between the cover and the detector housing. The cover may be laser welded to the detector housing. The detector gas may be argon gas. The detector gas may be a mixture of argon gas and another noble gas. The detector gas may be a mixture of argon gas and helium-3 gas. The opening and the tube may be threaded and the tube may be threaded into the opening. The apparatus may further include a layer of low outgassing epoxy installed between the opening and the tube. The first electrically-insulated retaining element may include a rivet nut and an insulating tube that is inserted in a passage defined by the plated anode frame and the insulating tube may be fixed within the passage with a low outgassing epoxy. The rivet nut may be crimped to an end of the anode wire and an opposite end of the anode wire may be passed through the insulating tube to the second electrically-insulated retaining element. The second electrically-insulated retaining element may include an insulating tube, a first conductive tube and a second conductive tube, and the insulating tube may be fixed into a passage defined by the plated anode frame using a low outgassing epoxy, and the first conductive tube may be fixed to the insulating tube using a low outgassing epoxy, and the anode wire may be crimped to the second conductive tube. The first conductive tube and the second conductive tube may be crimped together while the anode wire is tensioned to a predetermined tension.

A system for constructing a neutron detector includes an anode frame assembly device including a holding element configured to hold an anode frame in a predetermined position and permit passage of an anode wire that is secured at a first side of the anode frame to a tensioning element, wherein the tensioning element is configured to apply a predetermined tension to the anode wire.

The system may further include a crimping device configured to crimp the anode wire to a retaining element at a second side of the anode frame and the anode frame assembly device may define a channel for positioning the crimping device at a predetermined position and to prevent movement of the crimping device during tensioning. The predetermined tension may be between 1 and 5 oz. The tensioning element may include a predetermined weight that is attachable to an end of the anode wire. The tensioning element may include a push/pull gauge to which the anode wire is attachable and the push/pull gauge may be coupled to a threaded rod for moving the push/pull gauge relative to the holding element to adjust tension of the anode wire. The system may further include a laminating device configured to accept a first layer of Teflon, a foil of neutron-responsive material, a plated aluminum frame and a second layer of Teflon, and apply a predetermined temperature and predetermined pressure to laminate the foil to the nickel-plated aluminum frame. The predetermined temperature may be a temperature between 50° C. and 120° C. The system may further include a hydraulic press configured to apply a predetermined pressure through a stand-off element to a top lid with tapered sides to cause the top lid to press into a detector housing, wherein the stand-off element defines cavities to receive a gas tube and an electrical connector that are coupled to the top lid.

BRIEF DESCRIPTION OF THE DRAWINGS

FIG. 17A: Illustration of top view of an anode frame assembly.

FIG. 17B: Illustration of a side view of an anode frame assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
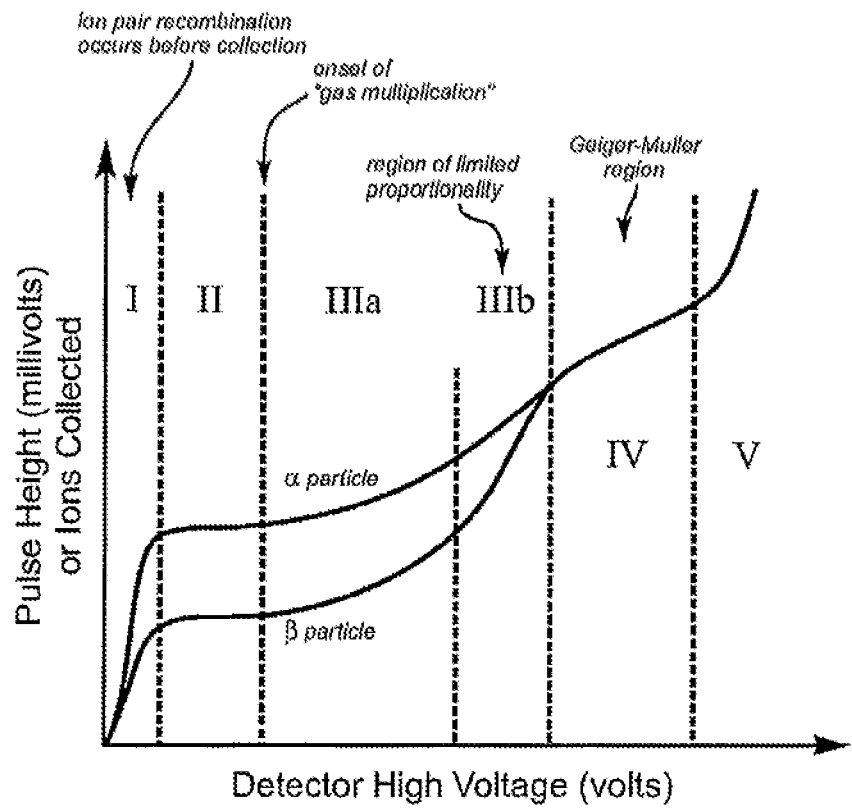
FIG. 1: The observed output pulse height versus the applied high voltage for a gas-filled detector, showing the main regions: (I) recombination, (II) ion chamber, (III) proportional, (IV) Geiger-Mueller, and (V) continuous discharge. This plot is often referred to as the gas curve.
Figure 2:
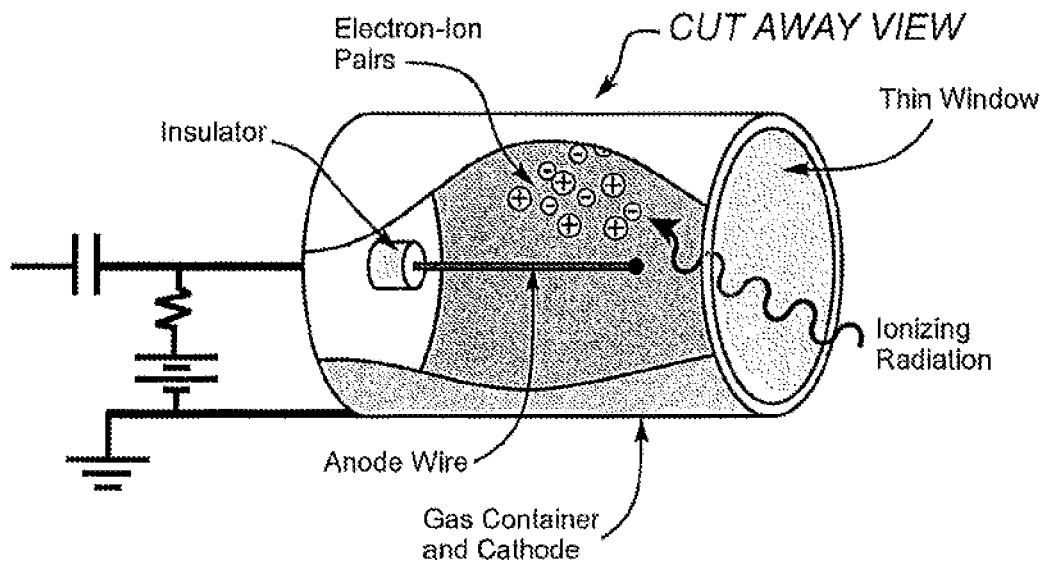
FIG. 2: Schematic view of a coaxial gas detector, which is commonly used for Geiger-Mueller tubes, and sometimes used for proportional counters. High voltage is applied to the central wire anode, while the outer cylinder wall, the cathode, is held at ground.
Figure 3:
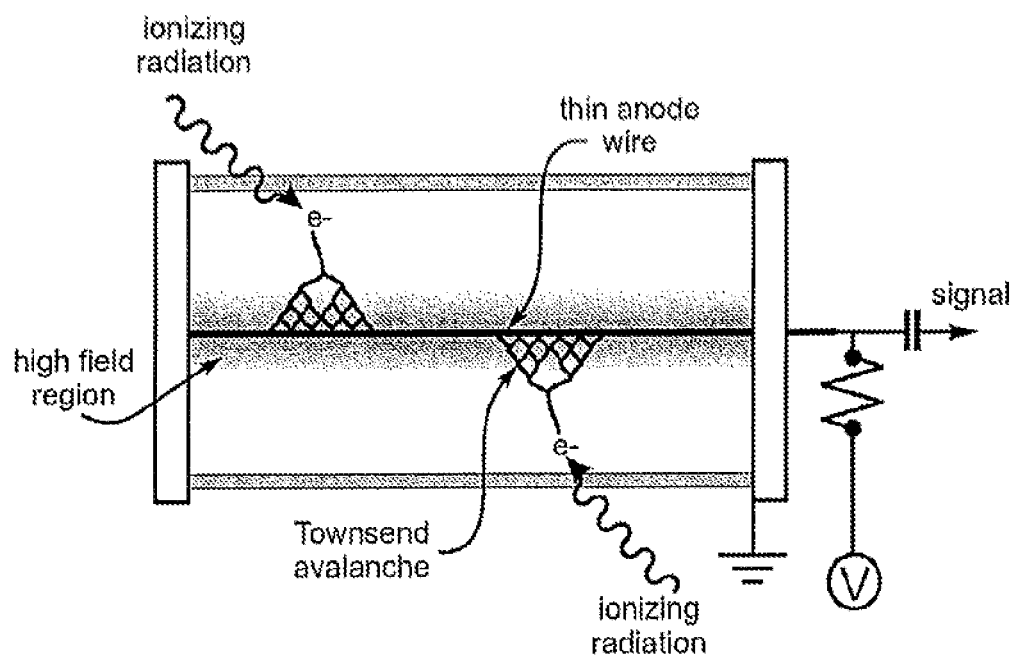
FIG. 3: With a high electric field near the anode of a gas-filled detector, signal gain is realized through impact or Townsend avalanching, often referred to as gas multiplication.
Figure 4:
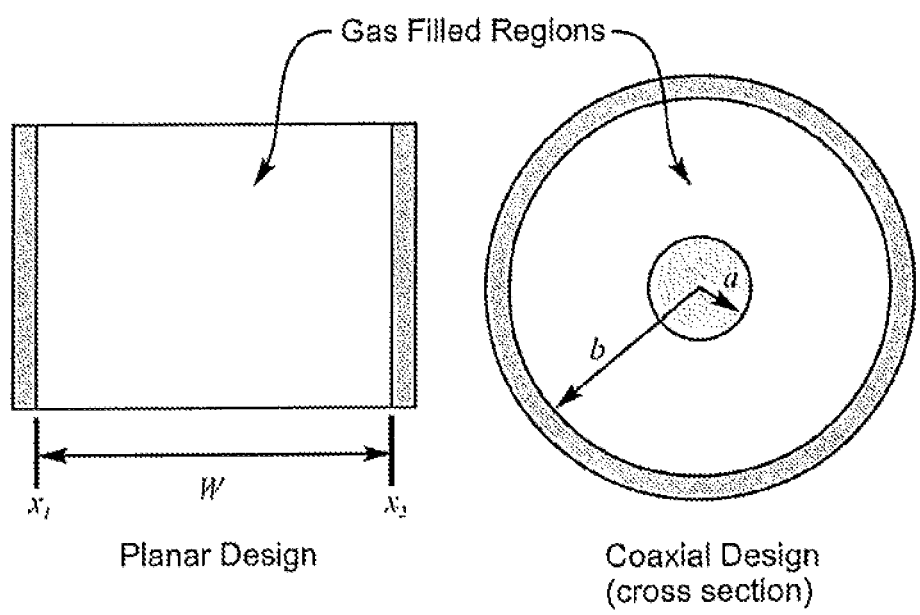
FIG. 4: Planar and coaxial geometries are often used for gas-filled radiation detectors.
Figure 5:
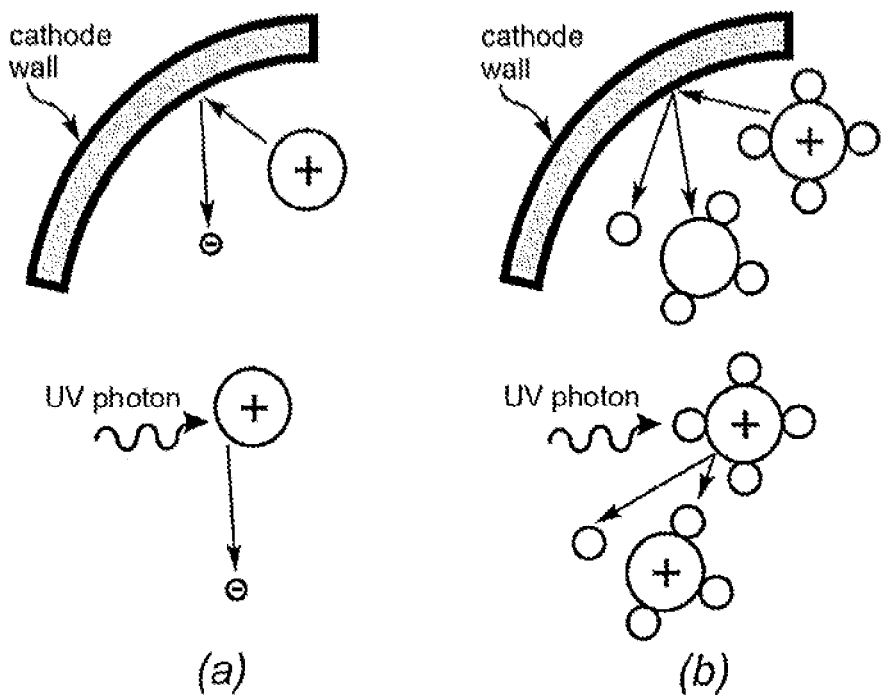
FIG. 5: A quench gas is used to prevent continuous avalanches in the proportional counter. When an argon ion strikes the cathode wall or absorbs excited UV photons, an electron may be ejected that can start another avalanche, as depicted in (a). The quench gas, usually an organic molecule, breaks apart when it strikes the cathode wall or when it absorbs a UV photon, hence does not release an electron that can start a new avalanche, as depicted in (b).
Figure 6:
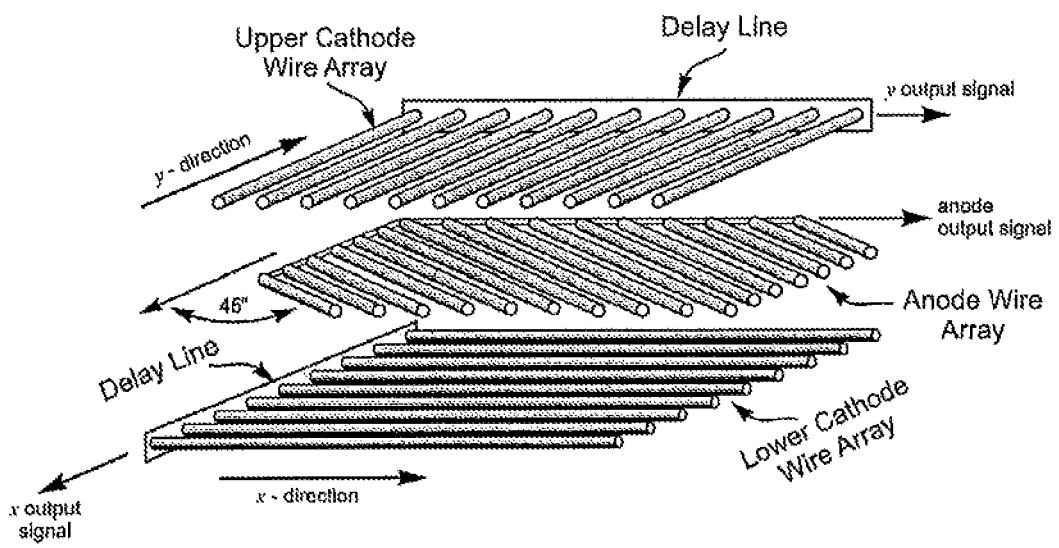
FIG. 6: A multiwire gas filled proportional counter is composed of parallel layers of wire arrays. Shown is a system with three parallel wire arrays, in which the upper and lower arrays are cathode wires arranged orthogonally. The middle anode array is arranged at a 45-degree angle to the cathode arrays.
Figure 7:
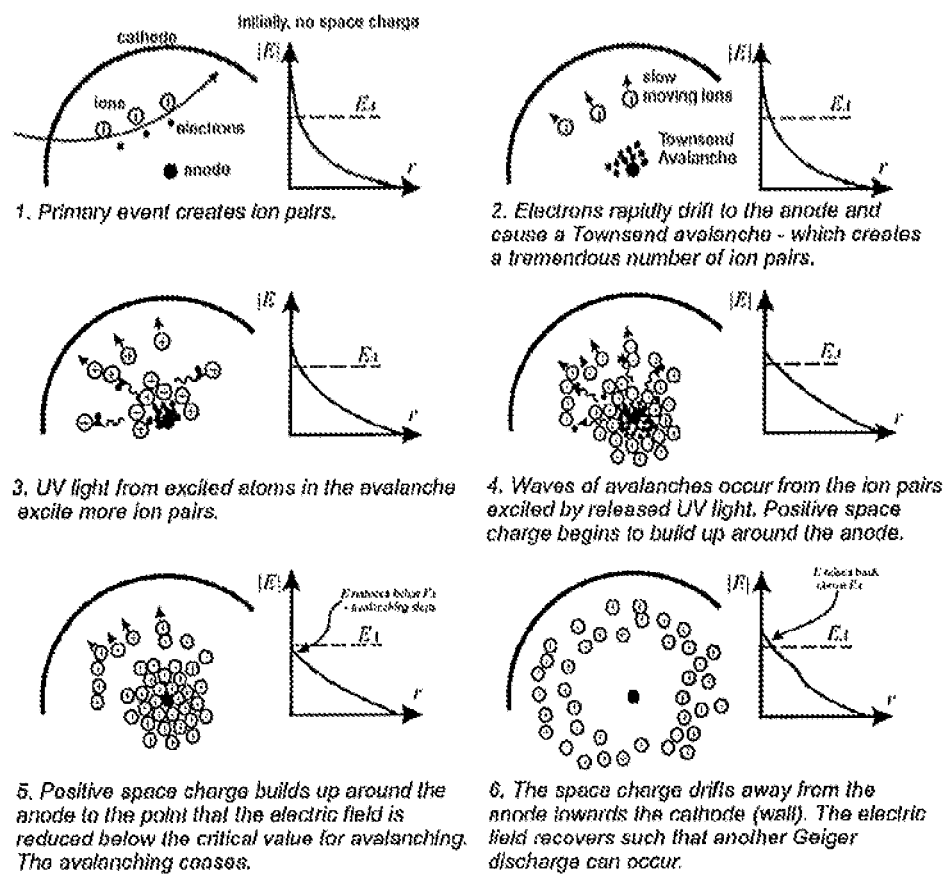
FIG. 7: Geiger-Mueller tube cross section depicting the progression of the Geiger discharge. The avalanching continues until the space charge accumulated around the anode wire decreases the electric field below the avalanche threshold causing the progression to cease.
Figure 8:
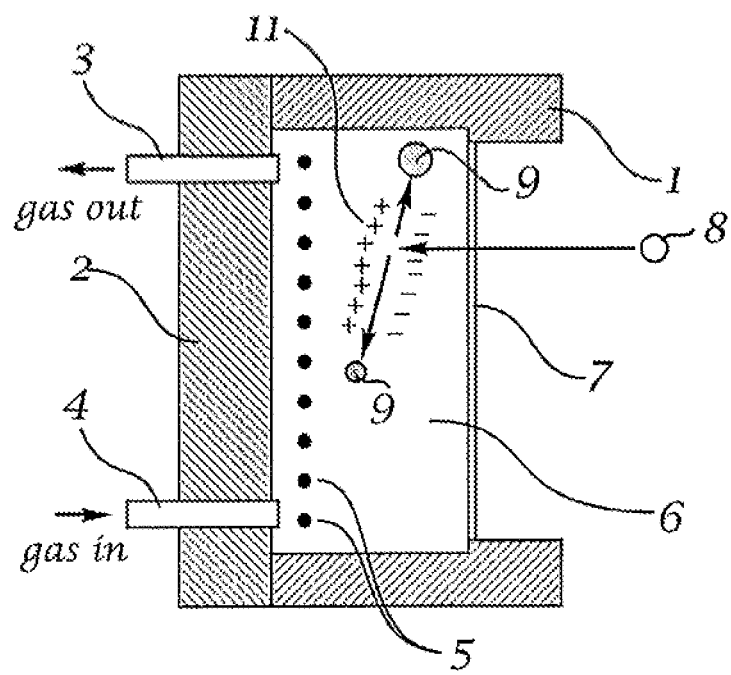
FIG. 8: Prior art showing a cross section of a common gas-filled coated neutron detector.

Referring now to FIG. 8 is prior art for a gas-filled neutron detector, depicting a cross section of a typical multi-anode gas-filled neutron detector. The detector is composed of a container with a lid 2 that contains the neutron-reactive detector gas in the cavity 6. The detector gas is generally a material that reacts strongly with neutrons. Example neutron-reactive gases used in these detectors include $^3$He and $^{10}$BF$_3$. A thin barrier 7 completes the detector enclosure. Aluminized Mylar is typically used as a thin barrier. The detector container 1 serves as an electrode. An additional electrode or series of electrodes 5 are provided, usually thin wires 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the outer perimeter and the current produced by their motion is measured and recorded as a neutron interaction event. The neutron-reactive gas is constantly replenished thought ports 3 and 4. The detector efficiency of FIG. 8 can be high, often above 80%.

Figure 9:
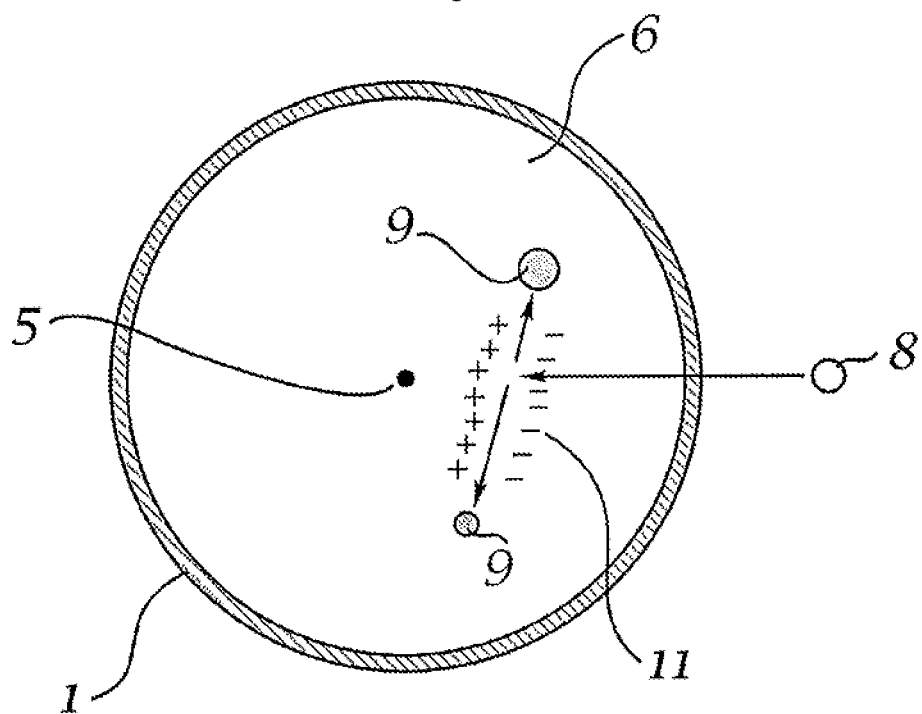
FIG. 9: Prior art showing a cross section of a common gas-filled neutron detector.

Referring now to FIG. 9 is prior art for a gas-filled neutron detector, depicting a cross section of a typical coaxial single anode gas-filled neutron detector. The detector is composed of a container 1 that contains the neutron-reactive detector gas in the cavity 6. The detector gas is generally a material that reacts strongly with neutrons. Example neutron-reactive gases used in these detectors include $^3$He and $^{10}$BF$_3$. The detector container 1 serves as an electrode. An additional electrode 5 is provided, usually a thin wire 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 9 can be high, often above 80%. The gas in this style of detector is not replenished and can be exhausted over a period of time.

Figure 10:
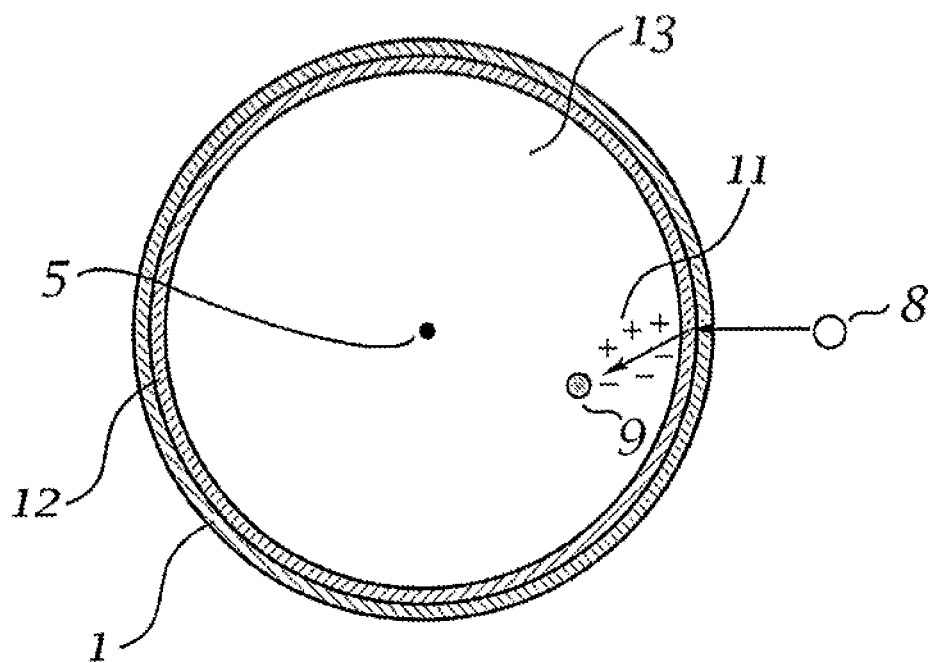
FIG. 10: Prior art showing a cross section of a common gas-filled coated neutron detector.

Referring now to FIG. 10 is prior art for a coated gas-filled neutron detector, depicting a cross section of a typical coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 10 is usually low, limited to less than 10%.

Figure 11:
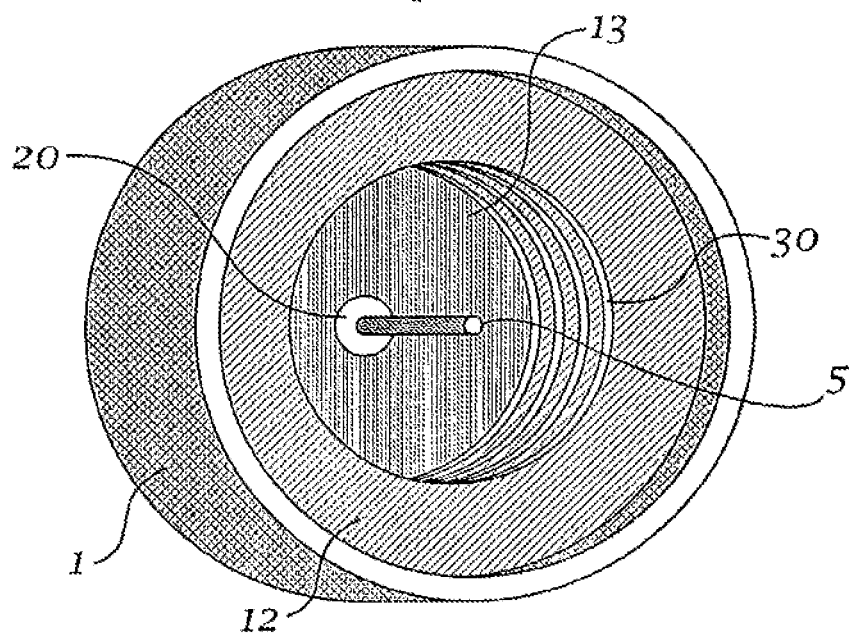
FIG. 11: Prior art showing a cross section of a gas-filled neutron detector filled with washers aligned down the cylindrical axis that are coated with neutron reactive material.

Referring now to FIG. 11 is prior art for a coated gas-filled neutron detector, depicting coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Torus shaped metal washers 30 are coated with neutron reactive material 12. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Figure 12:
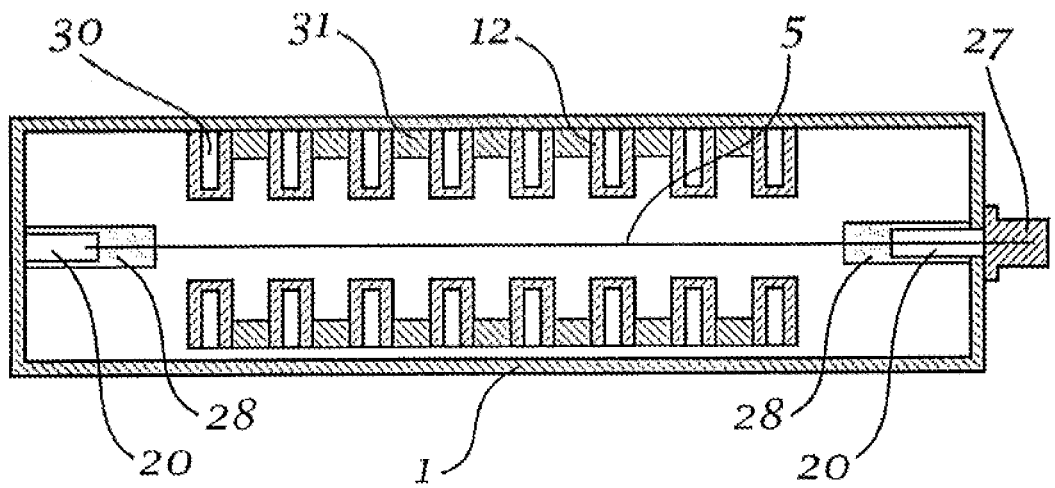
FIG. 12: Prior art showing a cross section of a gas-filled neutron detector filled with washers aligned down the cylindrical axis that are coated with neutron reactive material.

Referring now to FIG. 12 is prior art for a coated gas-filled neutron detector, depicting coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Torus shaped metal washers 30 are coated with neutron reactive material 12. The metal washers 30 are separated by insulting spacers 31. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Figure 13:
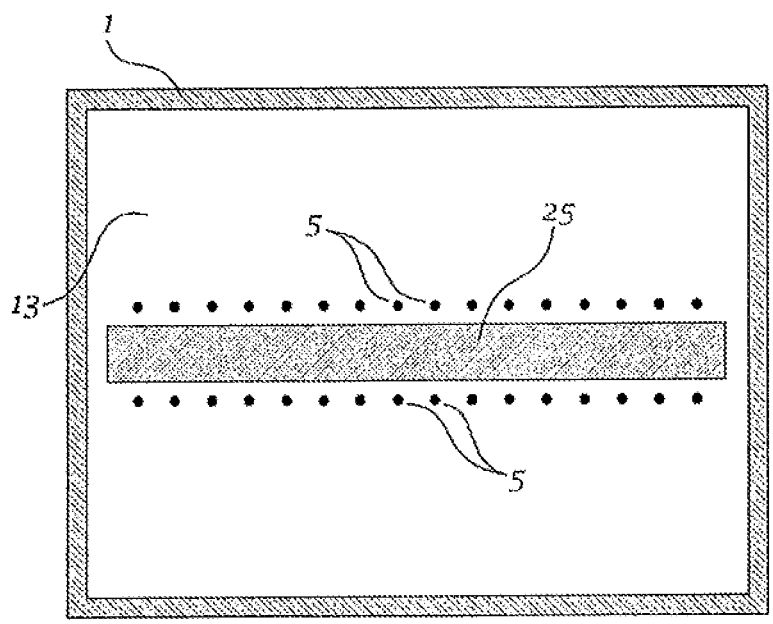
FIG. 13: Illustration showing an internal cross section view of a gas-filled multi-wire anode detector that has a fibrous or porous material inside the gas-filled container. The fibrous or porous material is either coated with neutron reactive material or is composed, at least partially, of neutron reactive material. The fibrous or porous material is arranged between the electrode wires. The porous material may be a foam, sponge or aerogel. The porous media has multiple holes formed and pointing inwards towards the anode.

Referring now to FIG. 13, there is shown another prior art variation of the compartmentalized gas-filled neutron detector, in which a fibrous or porous media 25 is inserted into the gas-filled chamber. The fibrous or porous media 25 is inserted between the anodes thereby reducing the wall effects. The detector container 1 serves as an electrode. An additional electrode or series of electrodes 5 are provided, usually thin wires 5, in order to apply a voltage across the gas in the detector cavity. Neutrons interact in the neutron reactive fibrous or porous media and subsequently cause the ejection of ionizing radiation. The ionizing radiation enters the gas and excites electron-ion pairs. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the cathodes and outer perimeter and the current produced by their motion is measured and recorded as a neutron interaction event. The neutron reactive porous materials 25 may include foam, sponge or aerogel or other porous media. Examples of the neutron reactive coating include boron-10, lithium-6 fluoride, lithium-6, uranium-235, gadolinium, or thorium-232 or any compound or mixture containing boron-10, lithium-6 fluoride, lithium-6, uranium-235, gadolinium, or thorium-232. Examples of neutron reactive porous materials 25 may include foam, sponge or aerogel and may be composed of, all are partially, are boron-10, lithium-6 fluoride, lithium-6, uranium-235, gadolinium, or thorium-232 or any compound or mixture containing boron-10, lithium-6 fluoride, lithium-6, uranium-235, gadolinium, or thorium-232.

Figure 14:
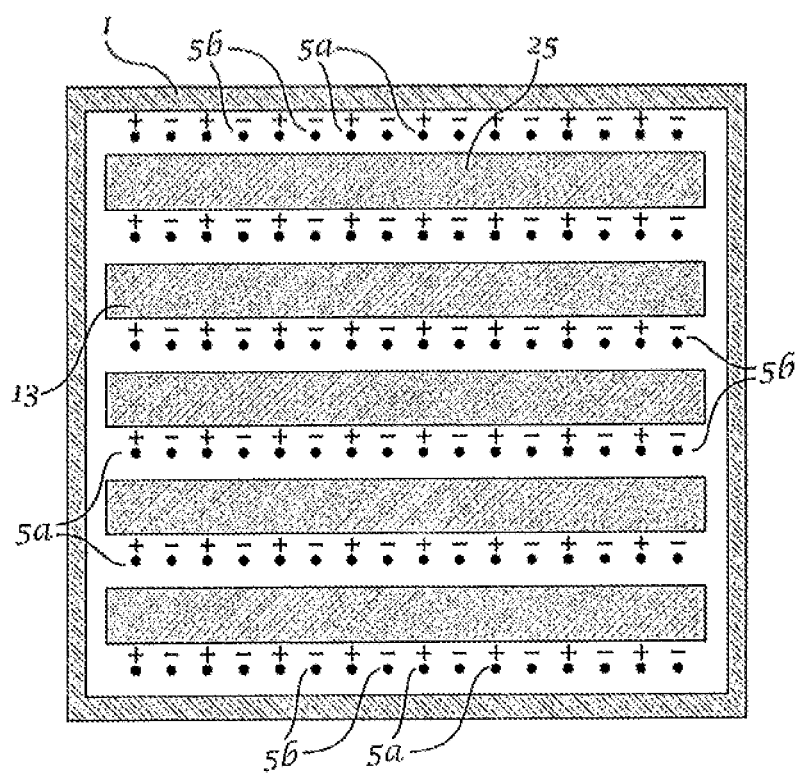
FIG. 14: Illustration showing an internal cross section view of a gas-filled multi-wire anode detector that has multiple fibrous or porous material sheets inside the gas-filled container. The fibrous or porous material is either coated with neutron reactive material or is composed, at least partially, of neutron reactive material. The fibrous or porous material is arranged between the electrode wires. The porous material may be a foam, sponge or aerogel. The porous media has multiple holes formed and pointing inwards towards the anode.

Referring now to FIG. 14, there is shown another prior art variation of the compartmentalized gas-filled neutron detector, in which a fibrous or porous media 25 is inserted into the gas-filled chamber. The fibrous or porous media 25 is inserted between the electrodes 5a and 5b, thereby reducing the wall effects. The electrode wires 5a and 5b can serve as anodes and cathodes. The electrodes can be biased alternately such that electric fields are formed between the anode and cathode wires as shown such that electron-ion pairs are collected locally. The detector container 1 serves as an electrode. The detectors may have multiple inserts of fibrous or porous media sheets 25 inserted between multiple sets of anodes 5. An additional electrode or series of electrodes 5 are provided, usually thin wires 5, in order to apply a voltage across the gas in the detector cavity. Neutrons interact in the neutron reactive fibrous or porous media and subsequently cause the ejection of ionizing radiation. The ionizing radiation enters the gas and excites electron-ion pairs. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the cathodes and outer perimeter and the current produced by their motion is measured and recorded as a neutron interaction event. The neutron reactive porous materials 25 may include foam, sponge or aerogel or other porous media. Examples of the neutron reactive coating include boron-10, lithium-6 fluoride, lithium-6, uranium-235, gadolinium, or thorium-232 or any compound or mixture containing boron-10, lithium-6 fluoride, lithium-6, uranium-235, gadolinium, or thorium-232. Examples of neutron reactive porous materials 25 may include foam, sponge or aerogel and may be composed of, all are partially, are boron-10, lithium-6 fluoride, lithium-6, uranium-235, gadolinium, or thorium-232 or any compound or mixture containing boron-10, lithium-6 fluoride, lithium-6, uranium-235, gadolinium, or thorium-232.

In those embodiments disclosed in FIGS. 13 and 14, a common element taught is the incorporation of large surface areas into a gas-filled detector, where these surfaces are coated with neutron reactive material, or the surfaces are composed, at least partially, of neutron reactive material. The surfaces are arranged in manner such that neutron streaming is minimal or eliminated when the detector is irradiated from a side. The surfaces may be flat or curved fins or plates. The surfaces may be replaced with absorbers of porous or filamentary material or a semi-solid material or aerogel. The incorporation of the extended surfaces coated with or composed of neutron reactive material increases the neutron detection efficiency of the gas-filled detectors over conventional coated designs.

Figure 15:
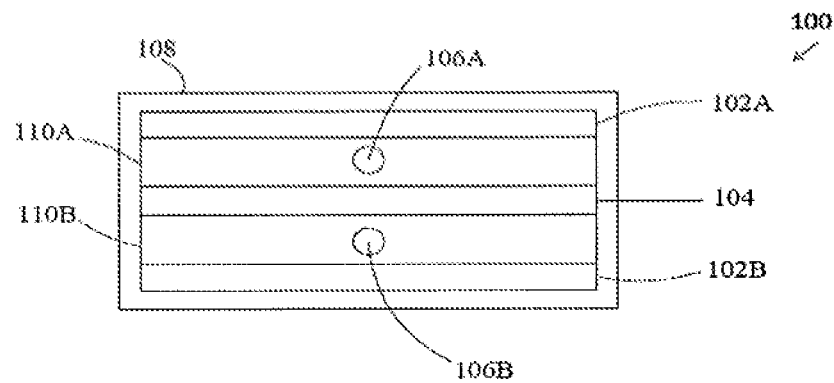
FIG. 15: Illustration of side view of a Lithium-foil detector having a single suspended foil.

A Li-foil gas detector is disclosed that addresses neutron sensitive area, weight and manufacturability of the Li-foil device. FIG. 15 depicts a simplified top-down cross-sectional view of a Li-foil gas detector 100 that includes Li-foil laminated (coated) walls 102 with a single suspended foil 104 between two anode wires 106. The anode wires 106 are supported by anode frames 110. A two foil configuration may provide the highest efficiency for unit cost. The Li-foil gas detector 100 may incorporate three foils (one suspended, two coated). Note that the system is not limited to this configuration and more walls and foils may be incorporated in a stack. The Li-foil gas detector 100 may include features that increase the manufacturability of the detector. The Li-foil detector 100 includes a housing 108 that may be formed of extruded aluminum tubing. The extruded aluminum tubing is available "off-the-shelf" and is a common size that can be ordered and shipped quickly. A detector insert (the portion containing the anode frames 110 and foil frames 102, 104) may be constructed with "off-the-shelf" screws without modification. A bottom insert frame may include threaded holes so that no fastening nuts are required in the build. All of the aforementioned modifications reduce build time and difficulty significantly. The design is straightforward, is a more simple-to-build design, and has a theoretical absolute thermal-neutron efficiency of approximately 34% for a single device. Note that the number of suspended foils may be increased by stacking more foils 104 and anode frames 110.

The above Li-foil gas detector 100 may be considered as a single-strip configuration. The Li-foil gas detector 100 may be duplicated and multiple gas detectors may be constructed adjacent to one another. A two-strip configuration and a 4-strip wide configuration may be constructed. For example, a two-strip configuration may include reconfigured anodes and foil frames that are twice as wide as the single strip device. In addition, additional anode wires may be inserted in the anode frames. An objective of the gas detector configurations may be to match the sensitivity of current designs or be superior if possible. In order to use off-the-shelf extruded rectangular aluminum tubing, the design may be made around those dimensions. Two suspended foils 104 can be incorporated into the tank with two wall foils 102 for effectively three reactive foils. While this increases build time, only two detector inserts are needed per backpack, compared to other designs. As such, the 2-strip design may require about the same amount of build time per backpack. Custom extruded tubing may conserve on the weight requirement. These configurations may allow the device to satisfy a weight requirement and a sensitivity requirement criteria (a theoretical absolute thermal-neutron efficiency of approximately 45% for a single device with three reactive foils). The gas detector may also be a one-strip design 100 having two suspended foils 104. The gas detector may include a custom extruded tank with $\frac{1}{16}$" inch thick walls, which dramatically reduces the device weight compared to the other designs. Build methods are similar for the various configurations. The example is one in which the neutron-sensitive material is Lithium. However, the above description can apply to foils that are coated with other neutron-sensitive materials.

Figure 16:
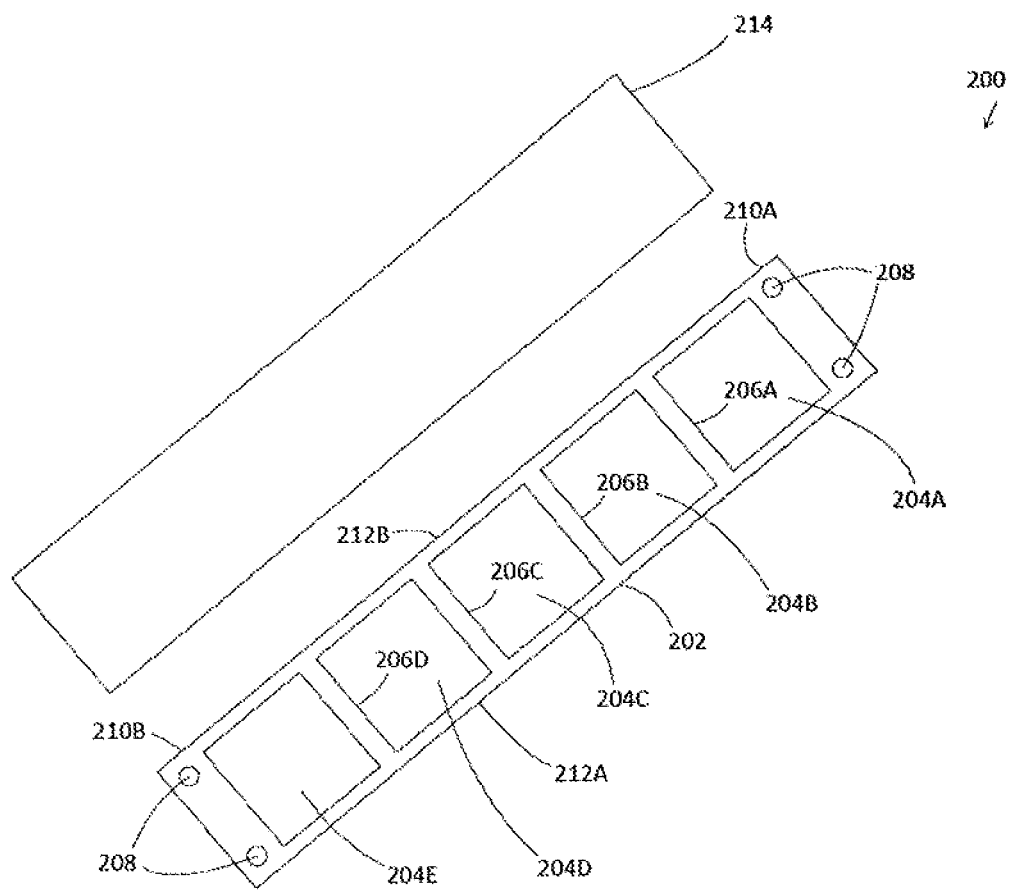
FIG. 16: Illustration of a foil frame assembly before the lamination process.

FIG. 16 depicts a possible foil frame assembly 200 for the Li-foil gas detector. The foil frame assembly 200 may include a foil frame 202 that is configured to support a lithium foil 214. The foil frame 202 may be comprised of side supports 212 and end supports 210. The side supports 212 and the end supports 210 may combine to form a rectangular shape. The foil frame 202 may include a plurality of struts 206 or cross supports coupled at intervals between the side supports 212. The struts 206 may divide the foil frame 202 into a plurality of windows 204. For example, the foil frame 202 may resemble a ladder. The foil frame 202 may be constructed of aluminum. The end supports 210 may define a plurality of openings 208 configured to allow a fastener to pass through. In some configurations, the openings 208 may be threaded.

The lithium foil 214 may be a 75-micron thick (Li enriched foil that is cut to a length corresponding to a length of the foil frame 202. The lithium foil 214 may include a plastic lining separator material. For example, in a roll of lithium foil 214, the plastic lining may maintain separation of the lithium foil 214 as the lithium foil 214 is rolled upon itself. The lithium foil 214 may be laminated with the foil frame 202. It was found that lithium in direct contact with aluminum produces a slow reaction between the lithium and the aluminum that results in contamination and elemental lithium loss. For example, testing showed that after about 6.5 weeks, the lithium begins to show degradation in areas where the lithium is in contact with the bare aluminum. Contamination may be observed on the lithium surface. It was determined that nickel plating of the aluminum surfaces will prevent lithium from reacting with the aluminum frame. The frame may also be plated with gold, platinum, palladium, silver, tin, or copper. The plating element may be one with which the lithium will not react with and that will prevent the lithium from reacting with the aluminum frame. Laminations performed on nickel plated aluminum frames have also been tested for longevity, and no degradation has been observed to date. While the descriptions may reference nickel-plated frames, the descriptions are also applicable to frames that are plated with other metals as well. While the descriptions may refer to nickel plating, plating with other metals is also within the scope of the description.

A minimum 500 microinch layer of metal, such as nickel, may be coated on to each foil frame 202 and anode frame. The metal may be a metal that does not react with the neutron-sensitive material. Example of the metal for plating include nickel, gold, platinum, palladium, silver, tin, and copper. The metal may be deposited using an electroplating process. The aluminum foil frames may be cleaned prior to plating.

The nickel-plated foil frame 202 may be laminated with the lithium foil 214. For example, an APACHE (model AL13P) laminator may be placed in an argon glove box to perform the lamination process. The APACHE is a generic paper laminator that includes heated rollers and supplies sufficient pressure for proper adhesion of the lithium/nickel plated aluminum interface. The lithium foil 214 with the plastic lining separator material may be placed on top of the nickel plated foil frame 202. The plastic lining separator may be kept in place and a $\frac{1}{32}$" thick strip of Teflon may be placed on top. The four layer collection may be run through the laminator at a predetermined temperature (e.g., 50° C.). The lithium foil 214 adheres to the nickel plated aluminum foil frame 202. All lithium handling may be carried out in a moisture free environment such as a dry box or dry room with less than a −40 C dew point (~0.5% relative humidity).

The plastic lining separator included in the lithium foil 214 roll aids in the lamination process as the lithium foil 214 does not stick to the plastic lining. Lithium will stick to Teflon so this plastic lining may be used as a barrier to prevent the opposite or top facing side of lithium foil 214 from being laminated. Therefore, the following process may be used for laminating the nickel-plated aluminum frames 202 with windows 204. The nickel-plated aluminum foil frame 202 may be placed on top of a $\frac{1}{32}$" thick Teflon sheet. A strip of lithium foil 214 with the plastic lining may be placed on the nickel-plated aluminum frame 202 with the bare lithium surface of the lithium foil 214 in contact with the nickel-plated aluminum frame 202. Another $\frac{1}{32}$" thick Teflon sheet may be placed on top of the lithium foil 214 and plastic lining. This five layer collection may be run through the laminator at a predetermined temperature (e.g., 65° C.). The predetermined temperature may be selected to be greater than 65° C., as lamination temperatures below 65° C. showed poor adhesion.

Laminations have been performed at temperatures up to 100° C. thus far and it appears the lithium "sticks" to the struts 206 securely at these higher temperatures. In some cases, the lithium foil 214 was forcibly removed from the frame 202 after lamination and pieces of the lithium foil 214 remained permanently adhered to the struts 206. Each of the struts 206 exhibited residual lithium foil still attached after the lithium foil 214 was forcefully removed. This is an indication that lamination will not fail after installation into a detector tank. As such, the predetermined temperature for lamination may be selected to be in a range that includes temperatures between 65° C. and 100° C. For example, a temperature range between 50° C. and 120° C. may be suitable. Note that the above-described lamination process may be applied to nickel-plated aluminum strips (without windows) with similar results.

Lamination of the lithium foil to an aluminum frame without nickel plating may be possible. The thin aluminum oxide layer that naturally coats aluminum can react with the lithium when in contact causing the lithium to degrade. However, lithium can sometimes only react when certain gases are present, such as moisture (e.g., water vapor). For example, lithium does not react in the presence of oxygen. However, when moisture is present, the reaction with moisture can lead to other reactions occurring. The reactions between aluminum and lithium may be lessened while under an argon atmosphere with no moisture present. Without nickel plating, degradation of the laminated structure depends on the environment in which the laminated structure is placed.

FIG. 17A depicts a top view of an anode frame assembly 300. FIG. 17B depicts an end view of the anode frame assembly 300. The gas detector may further include an anode frame 301. The anode frame 301 may be comprised of side walls 308 and end walls 310 to form a generally rectangular shape of size similar to the foil frame 200. The anode frame 301 may define anode wire openings 306 through a face of the end walls 310 for passage of an anode wire 316. The anode frame 301 may define a rectangular loop. The anode frame 301 may define one or more channels 304 in the end walls 310. The channels 304 may be rectangular. Within the channels 304, the end walls 310 may define a fastener opening 302 that is generally perpendicular to the anode wire openings 306. The fastener openings 302 may be configured to receive a fastening element for fastening multiple anode frame assemblies 300 together. The anode frame 301 may be machined from aluminum and nickel plated to prevent undesired interactions with the lithium foil frames.

The anode frame 301 may be configured to suspend an anode wire 316 between the end walls 310. The anode wire 316 may pass through openings 306 defined in the end walls 310 of the anode frame 301. The anode frame assembly 300 may include a first anode wire insulation and retention element 312 that is configured to retain an end of the anode wire 316 and prevent the anode wire 316 from contacting the anode frame 301. The anode frame assembly 300 may include a second anode wire insulation and retention element 314 that is configured to prevent the anode wire 316 from contacting the anode frame 301 and allow the anode wire 316 to pass through for tensioning.

Figure 18:
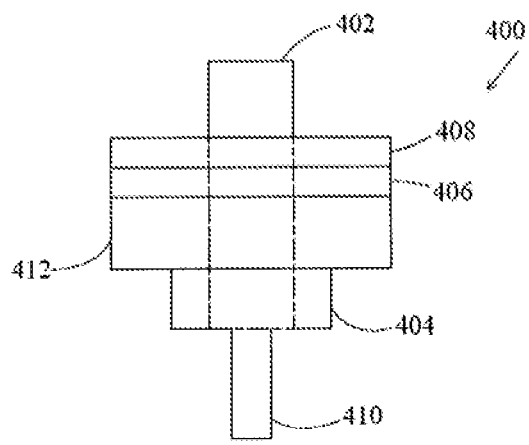
FIG. 18: Illustration of a ferrule for retaining an anode wire.

The insulation and retention elements 312, 314 may be ferrules that are configured to cooperate with the openings 306 to allow passage and retention of the anode wire 316 without contacting the anode frame 301. FIG. 18 depicts a possible configuration of a ferrule 400. The ferrule 400 may be configured to allow crimping of the anode wire 316 to the ferrule 400. The ferrule 400 may include an insulation tube 402 that is configured to insulate the anode wire 316 from the anode frame 301. The insulation tube 402 may be formed of zirconia, alumina, or other insulating ceramic material. The insulation tube 402 of the ferrule 400 may be adhered in the opening 306 using a low vapor pressure epoxy (e.g., Torr Seal®). The ferrule 400 may include a conductive body element 404. The body element 404 may include a flange portion 412 that is wider than a wire retaining portion 410. The ferrule 400 may further include a rubber washer 406 and a nylon washer 408.

The anode wire 316 may be constructed of steel or other conductive material. The anode wire 316 may be soldered and/or crimped to the retaining portion 410 of a first ferrule 400. The anode wire 316 may then be routed through the rubber washer 406, the nylon washer 408, the insulation tube 402, and the opening 306 of the anode frame 301. The anode wire 316 may then be routed through another zirconia ferrule 400, also with an insulation tube 402, a nylon washer 408, and a rubber washer 406. The rubber washer 406 may be included to provide some spring to the anode wire 316 with the goal of reducing microphonic effects in rugged situations. The ferrule 400 may be pushed tight to the anode frame 301 and the anode wire 316 may be pulled taut as the ferrule 400 is crimped to the anode wire 316. A small bead of solder may be applied at this crimped spot to permanently fix the anode wire 316 in place and reduce any risk of slipping. One of the ferrules 400 may be crimped to a butt crimp. A copper wire may be crimped to the other end of the butt crimp. Finally, a low vapor pressure sealant (e.g., Torr Seal®) may be placed around the insulating tube 402 of the ferrule 400 to prevent any shifting of the anode. The copper wire of the completed anode assembly may then be connected to an electrical feed-through of the detector lid using another butt crimp.

Various diameters of anodes wires between 200-micron and 25-micron may be utilized in the anode design. The small diameter wires, such as a 25-micron diameter gold plated tungsten anode wire, may introduce some complications when soldering the anode wire 316 into place while under tension. Soldering works initially, but when the anodes are installed into a tank and the tank is evacuated and baked out, eventually the solder gives out and the anode wire 316 may become loose, or release from the solder, leading to shorting failures. As such, crimping the anode wire 316 into place may improve retention. As such, fabrication methods for crimping the anode wire 316 may be used.

Figure 19:
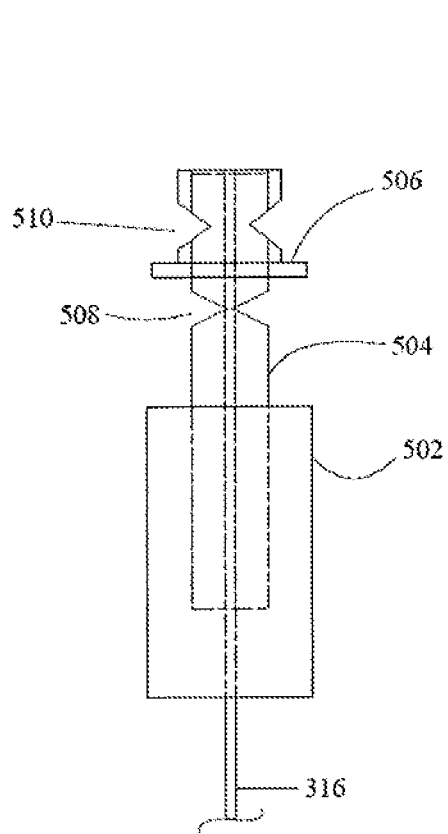
FIG. 19: Illustration of an insulation and retention element for a bottom of the anode.
Figure 20:
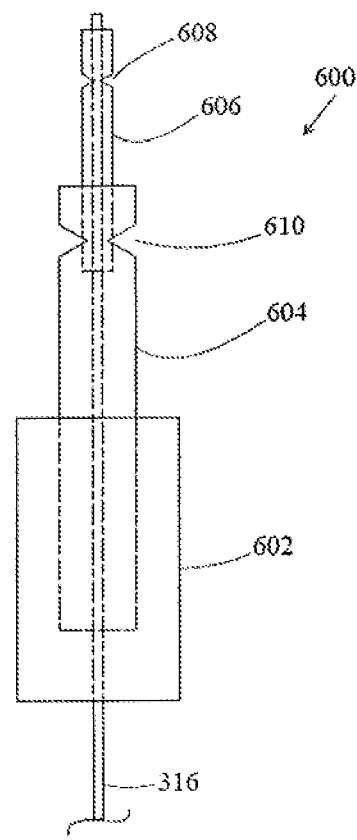
FIG. 20: Illustration of an insulation and retention element to a top of the anode.

The insulation and retention elements 312, 314 may be also constructed of tubing. FIG. 19 depicts a possible bottom anode 500 configuration for the first insulation and retention element 312. FIG. 20 depicts a possible top anode 600 configuration for the second insulation and retention element 314. The first insulation and retention element 312 may be installed at a bottom of the device. The first insulation and retention element 312 may be initially fixed to the anode wire to aid in tensioning. The second insulation and retention element 314 may be initially allow the anode wire to move freely therethrough to aid in tensioning.

The bottom anode 500 may be comprised of an insulating tube 502 that is configured to fit into the opening 306 in the end wall 310. The bottom anode 500 may include a tube 504 that is configured to receive the anode wire 316. The bottom anode 500 may include a rivet nut 506 that is configured to receive the tube 504. The anode wire 316 is secured to the tube 504 by a first crimp joint 508. The rivet nut 506 is secured to the tube 504 by a second crimp joint 510. For example, the insulating tube 502 may be a 0.094" ID×0.156" OD alumina tube. The tube 504 may be a 0.005" ID×1/16" OD stainless steel tube. The anode wire 316 may be a gold-plated tungsten wire. An 80-micron diameter anode wire may be used due to its availability and affordability. The insulating tube 502 may be sealed into place on the anode frame 301 using a low vapor pressure epoxy.

The top anode 600 may be comprised of an insulating tube 602 that is configured to fit into the opening 306 in the end wall 310. The top anode 600 may include a first tube 606 and a second tube 604. The first tube 606 may be configured to receive the anode wire 316. The second tube 604 may be configured to receive the first tube 606. The anode wire 316 may be secured to the first tube 606 by a first crimp joint 608. The first tube 606 may be secured to the second tube 604 by a second crimp joint 610. For example, the insulating tube 602 may be a 0.094" ID×0.156" OD alumina tube. The first tube 606 may be a 0.005" ID×1/16" OD stainless steel tube. The second tube 604 may be a 0.071" ID×0.089" OD stainless steel tube. The insulating tube 602 may be sealed into place on the anode frame using a low vapor pressure epoxy.

The above described tubing pieces may be custom cut with no burs and ready for fabrication. The parts may undergo the a 3-stage cleaning process including acetone, isopropanol, and methyl ethyl ketone in separate sonication baths, then baked at 60° C. for at least an hour. The insulating tubes (502, 602) may be sealed into place on both sides of the anode frame 301 using a low vapor pressure epoxy and allowed to cure for 24 hours. Next, the second tube 604 may be sealed into the insulating tube 602 on a top side of the anode frame 301. After another 24 hours, the anode wire 316 can be mounted into the anode frame 301. The stainless steel tube 504 may be crimped onto a gold-plated tungsten anode wire 316. An 80-micron diameter wire may be used due to its availability and affordability. The rivet nut 506 may then be crimped onto the bottom of the stainless steel tube 504, and the anode wire 316 may be fed into the insulating tube 502 that is within the opening 306 on a bottom side of the anode frame 301. The first tube 606 may be crimped to the anode wire 316. The crimped first tube 606 may be fed through the second tube 604. The first tube 606 and the second tube 604 should overlap such that at least a portion of the first tube 606 is within the second tube 604 to allow for crimping together. The anode frame 301 may be placed in an anode tensioning jig and the anode wire 316 may be tensioned to a predetermined tension. When the predetermined tension is achieved, the first tube 606 may be crimped to the second tube 604. The completed anode frame 301 may be removed from the anode tensioning jig and the residual anode wire 316 may be trimmed off.

Anode configurations with the rubber washers and polymer insulators may cause excessive out-gassing and arcing problems. As such, the anodes may be configured with only ceramic and metal components. Custom ferrules may include a longer zerconia insulative region that can accommodate for a spring (tensioner for the wire) and can protrude into the anode frame 301 to prevent arcing between the anode wire 316 and anode frame 301.

The amount of tension on the anode wire 316 affects the microphonic properties and affects the resolving time following a microphonic interaction. As such, tensioning of the anode wire is considered during anode fabrication. Li Foil MWPC devices fabricated with high-tensioned anode wires (e.g., ~20 oz) were found to suffer microphonic problems relating to "handclapping", loud voices, and tapping. The high-tensioned anode wire detectors were also found to have high resolving times. The resolving time is the time it takes for the microphonic electronic noise to resolve back down to a baseline level, sometimes on the order of 5 seconds. In an effort to reduce microphonic noise, tensioning of the anode wire 316 was explored. A spring was incorporated into the anode design to help reduce the tension on the wire in an effort to shift the primary and subsequent harmonics out of the sensitive frequency range of the preamplifier and to reduce the resolving time following a microphonic event. The addition of the spring did not help to reduce microphonic problems, but instead worsened the issue.

Figure 21:
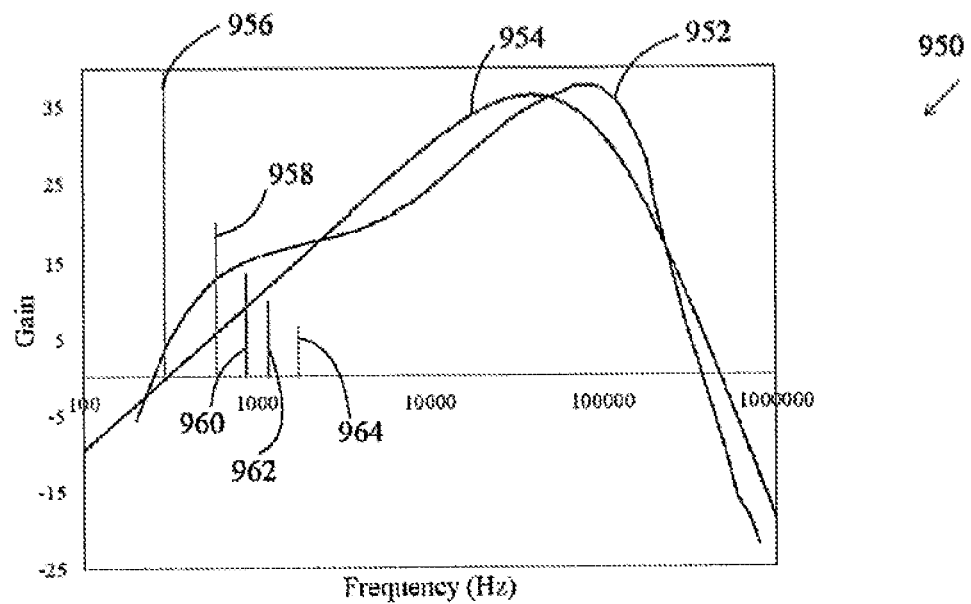
FIG. 21: Gain response of anode frame with 24 oz tension on the anode wire.

The anode wire tension may be set to avoid microphonic sensitivities. The frequency to gain response for the preamplifier and shaping amplifier are shown in FIG. 21. Here, the amount of electrical gain that occurs (both negative and positive) at a specific frequency is shown in a first curve 954 (simulated shaper gain) and a second curve 952 (preamplifier and shaper gain) curves. The fundamental harmonic 956, and $1^{st}$ 958, $2^{nd}$ 960, $3^{rd}$ 962 and $4^{th}$ 964 harmonic responses for the anode wire is calculated based on the tension that is applied to the wire, the thickness, density and length of the wire. With 24 oz of tension on the anode wire, the fundamental harmonic 956 and the $1^{st}$-$4^{th}$ 958-964 harmonics are all under the gain-sensitive area of the preamplifier and shaper—as shown by the vertical lines in FIG. 21.

Figure 22:
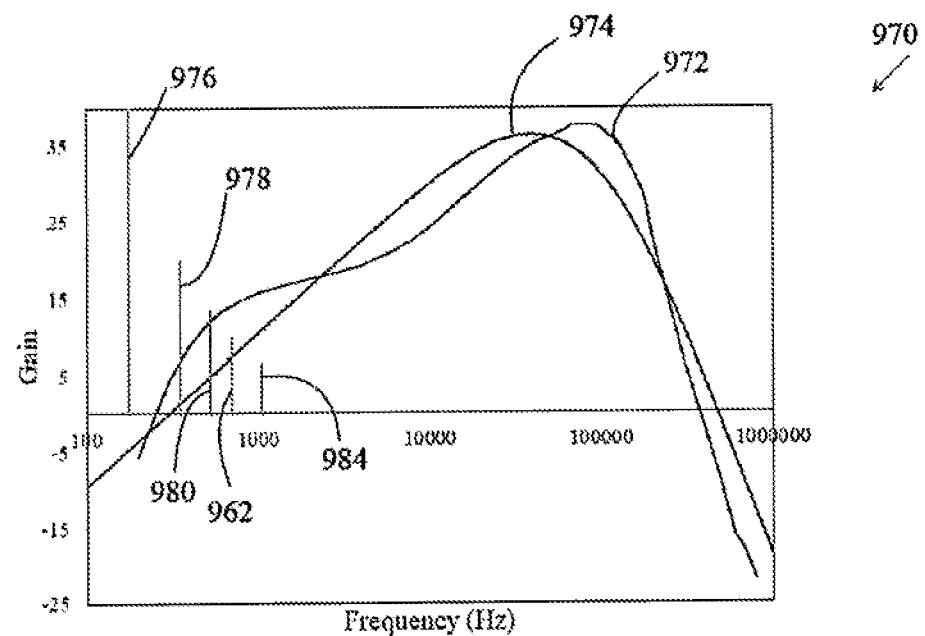
FIG. 22: Gain response of anode frame with 8 oz tension on the anode wire.

The tension can be adjusted so that the harmonics do not fall under that sensitive region as shown in FIG. 22 by reducing the amount of tension applied to the wire (8 oz applied shown in FIG. 22). The amount of electrical gain that occurs (both negative and positive) at a specific frequency is shown in a first curve 974 (simulated shaper gain) and a second curve 972 (preamplifier and shaper gain) curves. The fundamental harmonic 976, and $1^{st}$ 978, $2^{nd}$ 980, $3^{rd}$ 982 and $4^{th}$ 984 harmonic responses for the anode wire is calculated based on the tension that is applied to the wire, the thickness, density and length of the wire. The lower the tension applied to the anode wire, the more the fundamental and subsequent harmonics drop out of the sensitive region of the amplifier and shaper on the Li Foil MWPC electronics. A balance between tensioning so there is no anode sagging and microphonic reduction was found between 1 and 5 oz of anode tension.

Referring to FIG. 17, the anode wire 316 may be soldered or crimped to first anode wire insulation and retention element 312 (e.g., a first ferrule) to form a strong connection therebetween. The anode wire 316 may be routed through the openings 306 in the anode frame 301 and through the second anode wire insulation and retention element 314 (e.g., a second ferrule). An anode tensioning jig may be used to tension the anode wire 316. Variations of the anode tensioning jig are possible. The anode tensioning jig operates by applying a predetermined amount of tension on the anode wire 316 while the anode wire 316 is crimped and/or soldered to the second anode wire insulation and retention element 314. The anode tensioning jig may be comprised of a frame retention element and a tensioning element.

Figure 23:
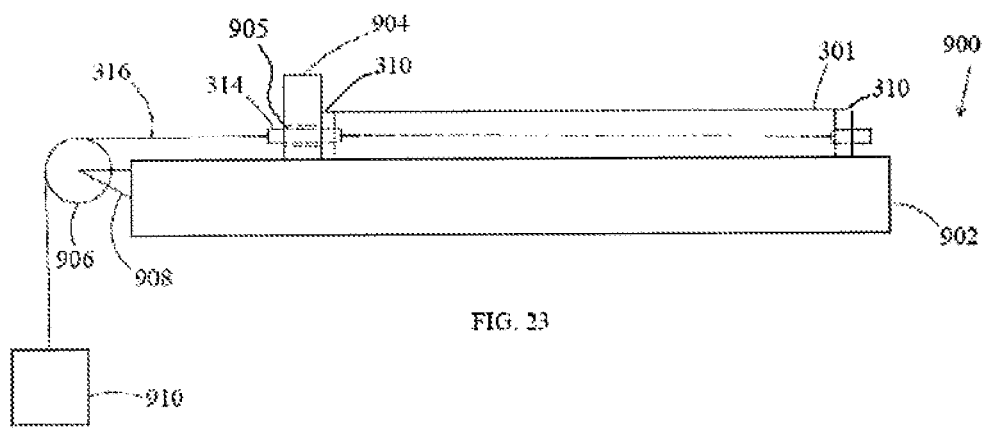
FIG. 23: Illustration of an anode wire tensioning jig using a weight.

FIG. 23 shows a first example of an anode tensioning jig 900. The anode tensioning jig 900 may be comprised of a platform 902 on which the anode frame 301 rests. The anode tensioning jig 900 may include a frame retention element that is a retaining wall 904 connected to the platform 902. The retaining wall 904 may be configured to allow the second anode wire insulation and retention element 314 and anode wire 316 to pass through while the end wall 310 of the anode frame 301 rests on the retaining wall 904. The retaining wall 904 may define an notch or opening 905 through which the second anode wire insulation and retention element 314 and anode wire 316 may pass through. The anode tensioning jig 900 may further include a pulley wheel 906 mounted such that the anode wire 316 passes around the pulley wheel 906. The pulley wheel 906 may be mounted to the platform 902 using a pulley mount 908. The anode tensioning jig 900 may include a weight 910 that may be attached to the anode wire 316 to tension the anode wire 316 to a predetermined tension.

The anode wire 316 may be tied into a knot and the anode frame 301 may be placed top-side down on the platform 902 with the second anode wire insulation and retention element 314 passing through the notch cut out of the notched wall 904. The second anode wire insulation and retention element 314 may extend into the notch and the weight 910 may be connected to the anode wire 316 using the knot. The constant weight 910 applied to the anode wire 316 may keep the anode wire 316 taut while the second anode wire insulation and retention element 314 is crimped and/or soldered. The weight system 910 for the anode wire 316 build allows for the same tension to be applied for consistency in every anode build. When the weight 910 is removed after crimping/soldering, the anode wire 316 inside the anode frame 301 remains taut. The anode wire 316 may also be soldered to the second anode wire insulation and retention element 314.

Figure 24:
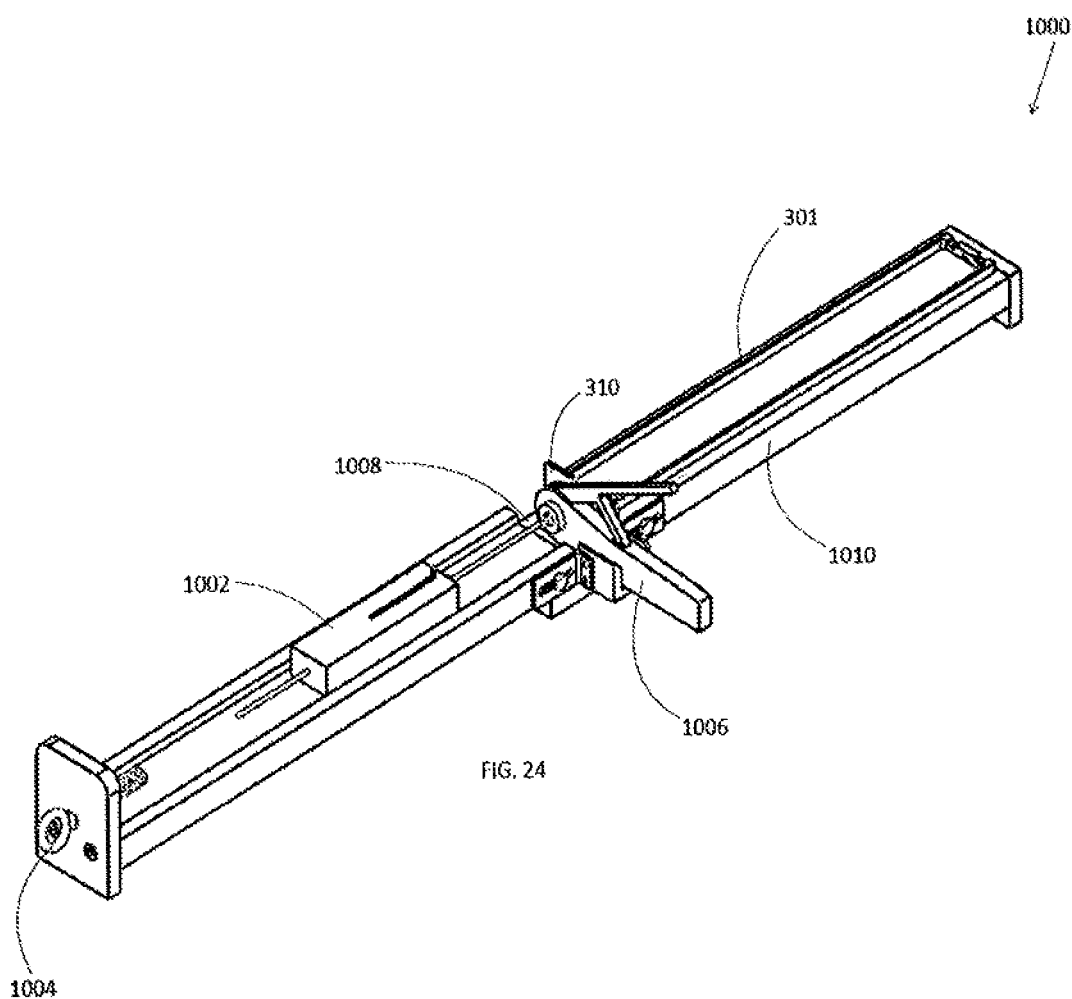
FIG. 24: Illustration of an anode wire tensioning jig using a movable element to adjust the tension.

FIG. 24 shows a second example of an anode tensioning jig 1000. In this configuration, the anode tensioning jig 1000 may incorporate a push/pull gauge 1002 and include a space for a crimping tool 1006. The anode tensioning jig 1000 may include a threaded rod 1004 cooperating with the push/pull gauge 1002 to adjust the tension of the anode wire 316. For example, the threaded rod 1004 may move the push/pull gauge 1002 and control the distance between the end wall 310 of the anode frame 301 and an attachment point of the anode wire 316 to the push/pull gauge 1002. The anode tensioning jig 1000 may include a holding frame 1010 that is configured to retain the anode frame 301 in a fixed position.

The process may include applying a predetermined tension or force to the anode wire 316. When the predetermined tension is reached, the second anode wire insulation and retention element 314 may be secured by crimping around the anode wire 316. The crimp prevents the anode wire 316 from moving relative to the second anode wire insulation and retention element 314 and the predetermined tension may be maintained. The anode wire 316 may be severed at the second anode wire insulation and retention element 314. The anode tensioning jig 1000 may incorporate a channel 1008 to facilitate crimping of the second anode wire insulation and retention element 314. For example, a slot or groove for a crimping tool 1006 may be present in the location at which the second anode wire insulation and retention element 314 extends from the holding element 1010. The channel 1008 may support and align the crimping tool 1006 during the crimping operation.

Operation of the anode tensioning jig 1000 includes first connecting the anode wire to the push/pull gauge 1002. The operator may then adjust the threaded rod 1004 to adjust the position of the push/pull gauge 1002. As the push/pull gauge 1002 is moved, tension on the anode wire changes. The operator may adjust the threaded rod 1004 until the desired tension is indicated. While the anode wire is tensioned, the operator may operate the crimping tool 1006 to crimp the anode wire to the second anode wire insulation and retention element 314.

In some configurations, the detector was operational, but spurious counts (possibly arcing) were observed. It was suspected that the components were not cleaned well enough causing areas of electric field spikes that may cause extremely high energy pulses. An additional concern is that insulating components such as the rubber washers and anti-static tubing may be out-gassing and causing a reaction with the lithium which results in arcing. The build process may be configured to avoid these contamination problems. Ceramics can easily be cleaned of contaminates using methyl ethyl ketone solvent which will clean them of any out-gassing contaminates.

To address the contamination issue, the Li Foil MWPC fabrication may begin with an extensive cleaning process. As a first step, all ceramic and metal components (mainly for anode fabrication) may undergo a fifteen minute sonication bath in each of the following solvents: Acetone, Isopropanol, Methyl Ethyl Ketone (2-butanone). All components may be then baked at 100° C.

As a second step, all frames before being nickel plated may undergo a three-step cleaning process to remove fingerprints and residual cutting fluids: A soapy water bath and scrub, followed by a fifteen minute acetone soak, and a final fifteen minute isopropanol soak. After nickel plating, the frames may be rinsed in deionized (Dl) water to remove residual dusts.

As a third step, all tanks and lids may also undergo a three-step cleaning process to remove fingerprints and residual cutting fluids: A soapy water bath and scrub, followed by a fifteen-minute acetone soak, and a final fifteen minute isopropanol soak.

Components used for fabrication may be loaded into a glove box and/or a dry room. Note that the longer the frames are stored in a dry environment, the faster the detector can be evacuated.

Figure 25:
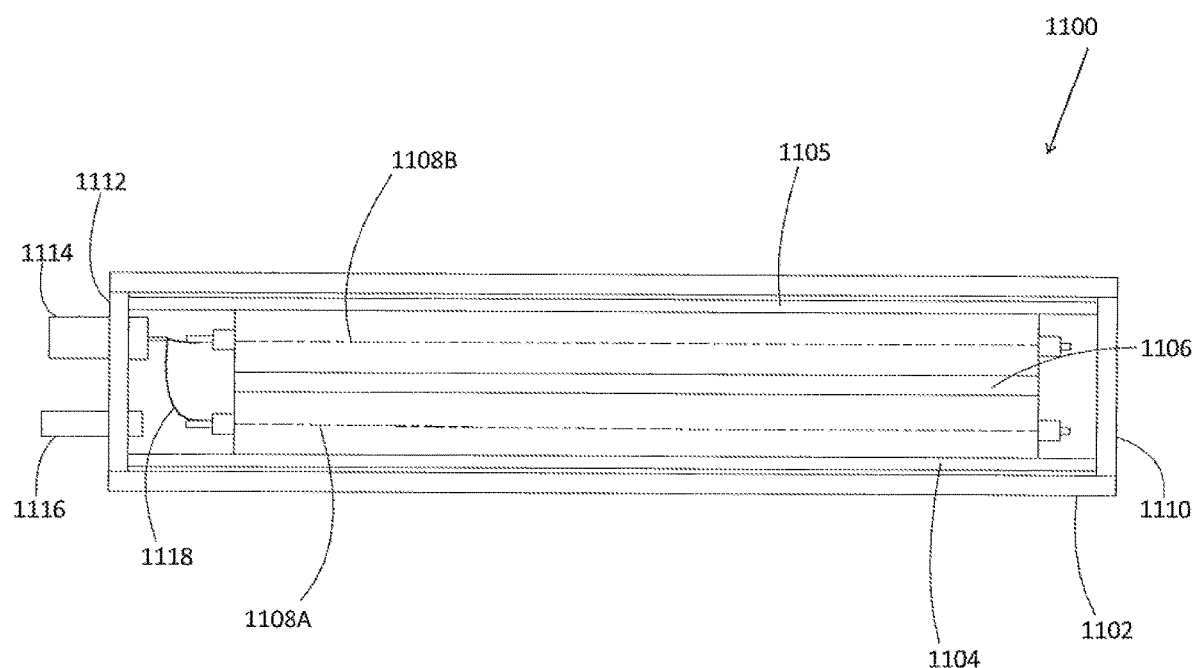
FIG. 25: Illustration of an assembled multiwire proportional counter (MWPC) device.

Once the foil frames are laminated and the anodes are fabricated, the detector insert can be fabricated. FIG. 25 depicts a side view of a detector assembly 1100. The detector assembly 1100 may include a housing or tank 1102 that may be a rectangular tube. The detector assembly 1100 may include a bottom foil assembly 1104 and a top foil assembly 1105. The detector assembly 1100 may include a suspended foil assembly 1106 placed between a pair of anode assemblies 1108. The suspended foil assembly 1106, the bottom foil assembly 1104 and the top foil assembly 1105 may be constructed by laminating lithium foil to a plated aluminum frame as previously described herein. The bottom foil assembly 1104 and the top foil assembly 1105 differ from the suspended foil assembly 1104 in that the frames extend beyond the length of the anode assemblies 1108. For example, the extensions may be arms that extend from each corner of the frame. In other configurations, the extensions may extend across the width of the frame. The anode assemblies 1108 may be constructed as previously described herein.

The detector assembly 1100 may include a bottom lid 1110 that is configured to enclose the bottom-side of the detector assembly 1100. The detector assembly 1100 may include a top lid 1112 that is configured to enclose the top-side of the detector assembly 1100. The top lid 1112 may also provide an interface between the external environment and the inside of the detector assembly 1100. The top lid 1112 may include an electrical connector 1114 that is configured to pass electrical signals from an interior of the detector assembly 1100 to external devices. The top lid 1112 may also include a gas interface 1116 that may be used for evacuating and filling the detector assembly 1100. The anodes may be electrically connected together with a daisy chain of conductors 1118. The conductor 1118 may be a tinned-copper wire or other conductive, non-corrosive material. The conductor 1118 may be configured to electrically couple the anode wires of each anode assembly 1108 to the electrical connector 1114. The conductor 1118 may crimped and/or soldered to the ferrules and electrical connector 1114.

The detector assembly 1100 may be assembled by alternately stacking the anode assemblies 1108 and the suspended foil assembly 1106. Note that additional anode assemblies 1108 and suspended foil assemblies 1106 may be stacked depending on the configuration. The anode assemblies 1108 may be coupled together using fasteners in the perpendicular openings (FIG. 17, 304). The electrical connector 1114 of the top lid 1112 may be connected to the insert electrically using a crimp. The detector insert and lids can be placed into the tank 1102. The top foil assembly 1105 and the bottom foil assembly 1104 may be coupled to the stack. The top foil assembly 1105 and the bottom foil assembly 1104 may include arms that extend from the edge of one side. The arms may be configured to attach to the top lid 1112 and the bottom lid 1110. For example, the lids 1110, 1112 may define grooves or slots for receiving ends of the arms. The arms may define an amount of space between the lid 1110, 1112 and the end walls of the anode assemblies 1108. The top foil assembly 1105 may be referred to as a top wall frame and the bottom foil assembly 1104 may be referred to as a bottom wall frame. The top foil assembly 1105 and the bottom foil assembly 1104 may be formed using the above-described lamination process.

Figure 26:
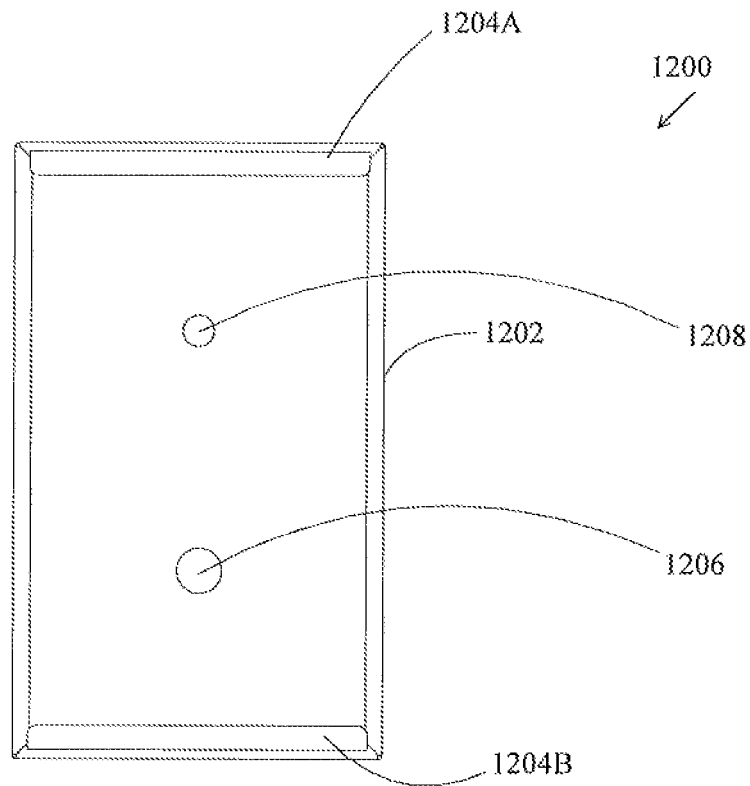
FIG. 26: Illustration of a top lid for the MWPC device.
Figure 27:
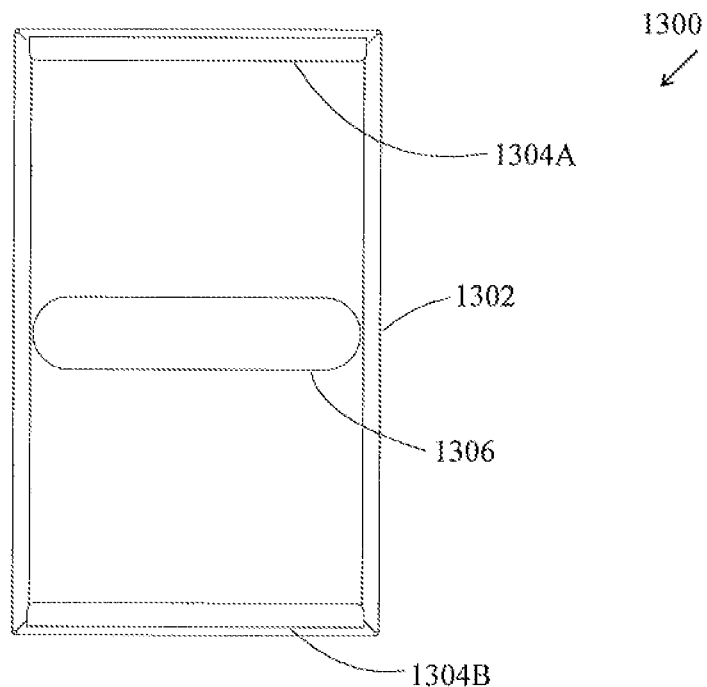
FIG. 27: Illustration of a bottom lid for the MWPC device.

In effort to avoid metal on metal vibrational contact between the detector insert (anode assemblies and Li-foil frames) and the tank containment 1102, different ways of locking in the insert were explored. The arms on the top foil assembly 1105 and the bottom foil assembly 1104 may be bent outward, then the detector insert may be slid into the detector containment 1102. The outward bent arms help to keep the detector insert locked into place within the tank 1102. However, using this technique, the bottom of the detector insert may not lock well and has the potential to vibrate. Another strategy is the use of a press-in lid having a channel in the bottom of each lid to lock in the arms of the insert when everything is pressed together. An example of the top lid is shown in FIG. 26 and example of a bottom lid is shown in FIG. 27. Once the lids are pressed into place, the insert is firmly housed inside the tank 1102 and does not move.

A top lid 1200 may be comprised of a plate 1202 that is sized to be press-fit into the tank 1102. The plate 1202 may define a first opening 1206 for an electrical connector. The plate 1202 may define a second opening 1208 for a gas tube to pass through. The plate 1202 may define channels or grooves 1204 for receiving ends of the arms of the top and bottom foil assemblies.

A bottom lid 1300 may be comprised of a plate 1302 that is sized to be press-fit into the tank 1102. The plate 1202 may define a cavity 1306 that is approximately centered on the plate 1202. The cavity 1306 may be configured to increase the distance between the plate 1302 and the insulation and retention element on the bottom side to reduce the chances of arcing at the bottom lid 1300. The plate 1302 may define channels or grooves 1304 for receiving ends of the arms of the top and bottom foil assemblies.

Referring again to FIG. 25, The top lid 1112 and the bottom lid 1110 may be designed with a channel (e.g., 1204, 1304) on the bottom side (facing toward anode assemblies) of each lid for the insert assembly arms to fit into, which holds the insert assembly firmly in place. The top lid 1112 may also configured for various electrical connectors and gas inner-tube (GIT) connections. The electrical connector 1114 may be a receptacle bulkhead connector such as a safe high voltage (SHV) or a feed-though electrical connector. The Li Foil multi-wire proportional counter (MWPC) may incorporate an SHV electrical bulk-head connector that is rated for 3000 volts. The Li Foil MWPC operates at 500 V and does not necessitate such a high voltage connector. A subminiature version A (SMA) connector may be used. However, testing found that 500 volts on this connector may cause intermittent breakdown problems. An electrical feedthrough using a 1000 volt RMS solderable connector may be used. The connector 1114 may be designed to be welded to the top lid 1112. As another example, a 0.1545" reamer may be used to bore out a feedthrough hole in the top lid 1112 and the top lid 1112 may be placed into an oven at 250° C. With the thermal expansion of the aluminum top lid 1112, the feedthrough may be slipped into place and allowed to cool. The aluminum contracts onto the feedthrough and makes a firm placement of the feedthrough. Low outgassing epoxy may be used to seal the seams to make for a hermetic seal at the interface. In some configuration, the electrical feedthrough may be a bare wire for a solder connection to the electronics package. The bare wire may be routed through the electrical feedthrough via an insulating element to prevent the bare wire from contacting the top lid 1112.

The top lid 1112 and the feed-throughs may be configured to be laser welded. The lids 1110, 1112 may be constructed of a 4047 or a 4032 aluminum to permit being welded to a 6061 aluminum tank 1102. The 4047 and 4032 alloys are commonly used for aluminum welding sticks for filler material. In this case, the entire lid 1110, 1112 may be made from the "filler" alloy. A lid 1110, 1112 may be cut from the 4047 sheet and equipped with a gas feed-through and an electrical feed-through. The gas feed-through and the electrical feed-through may be achieved by a drilling operation. The tank 1102 may be formed of aluminum as an extruded tube that may have a rectangular cross section.

The lids 1110, 1112 may be laser welded to the tank 1102. In addition to laser welding, other lid fastening alternatives are possible. A bolt-on flange with a rubber gasket may be utilized. However, the rubber gasket may out-gas which causes lithium contamination and arcing problems. Additionally, the flange is bulky and increases machining cost, aluminum cost, and weight of the device. A push-over lid and a push-in lid are possible alternatives. The push-over lid and the push-in lid may be designed with a taper, or an angle that, when forced into place, causes contact with the aluminum tank where an aluminum to aluminum cold weld can be made. Any unsealed or uneven areas can be filled in with a low out-gassing sealant, such as Tort Seal®.

The push-over lid may be designed to be pushed over the top of the tank 1102 after the neutron sensitive insert is placed inside the tank 1102. The lid may be designed with a taper on the internal dimensions so when the lid is forced over the tank 1102, aluminum to aluminum contact is made. Bare aluminum to aluminum contact can make a cold weld and therefore hermetically seal the tank. Fabricating such a lid is possible, however may require micro-machining in the corners to match the radius of the tanks.

The top lid 1112 and the bottom lid 1110 are depicted as push-in lids. The push-in lid may be designed to be pushed into the tank 1102 forcing aluminum to aluminum contact between the lid 1110, 1112 and the tank wall. This aluminum to aluminum contact can cause a cold weld which can form a hermetic seal. The push-in design may be easier to manufacture compared to the push-over lid. The push-in lids may be made with a 5-10 degree taper on the sides of the lid. A 0.015" corner radius can be implemented using a multi-angle waterjet cutting system.

The lids 1110, 1112 may be pressed into the tanks 1102 using a press machine. Areas in which the push-in lid does not contact the tube 1102 can be filled in with a low out-gassing sealant, such as Torr Seal®, or an aluminum based epoxy. The push-in method for tank sealing may be implemented in a dry-room atmosphere.

In some configurations, the gas interface 1116 may be a inch diameter aluminum gas feed-through that is welded into the laser weld-in lid. The top lid 1112 may define an opening for the gas feed-through. Welding the ¼" diameter aluminum tube into the lid 1112 may be difficult and aluminum is generally not a material of choice for pinch-off hermetic sealing. Copper may be a more suitable material for pinch-off sealing. It may be possible to braze a copper tube to the aluminum tube. However, it may not be advisable to weld the thin wall aluminum tube to the top lid 1112 for production purposes. Welding the thin wall is difficult and has a high probability of leaking. Other ways of attaching copper, or another soft metal, to the aluminum top lid 1112 may be possible.

The gas interface 1116 may be a gas inner-tube (GIT) that is fed through the top lid 1112. As aluminum does not make for a good pinch-off material for gas vessel sealing purposes, attaching a copper feed-through to the aluminum lid 1112 may be used. Methods for attaching the tube 1116 with only epoxy may result in a weak connection and lead to cracks and hermetic failures. In addition, most sealants and epoxies are not compatible with lithium as outgassing of the epoxy material may lead to degradation of the lithium foil.

Figure 28:
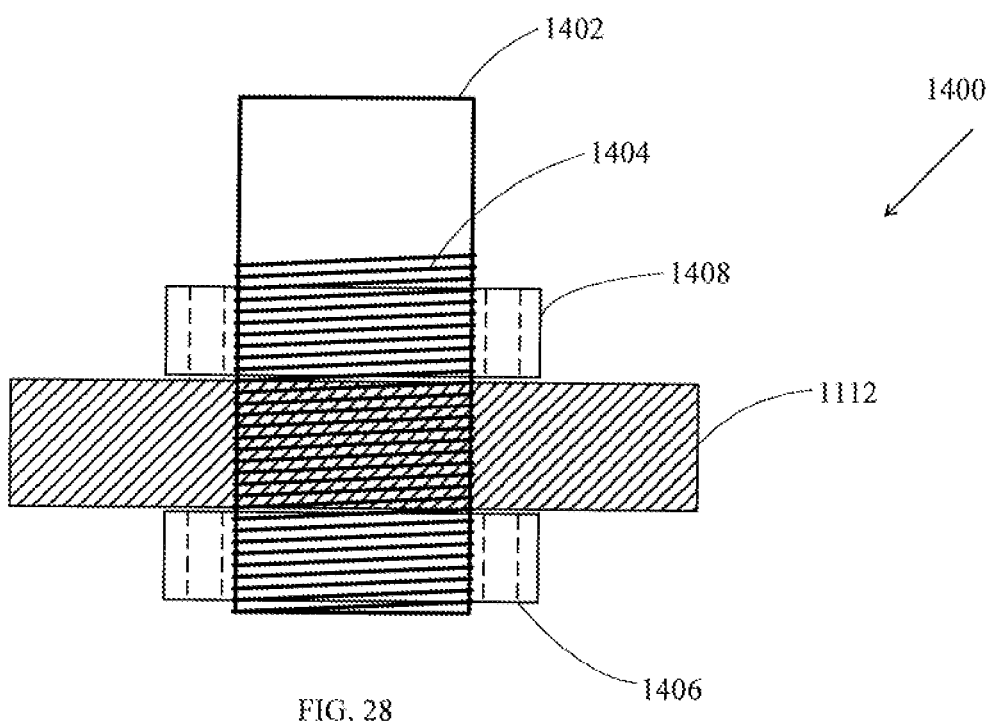
FIG. 28: Illustration of a gas feedthrough for the MWPC device.

FIG. 28 depicts a possible configuration for a gas inner tube (GIT) interface 1400. The GIT interface 1400 may include a copper tube 1402 (or whatever material chosen that can be threaded and pinched off). The copper tube 1402 may include a threaded portion 1404. The threaded portion 1404 may be configured to cooperate with a threaded opening of the top lid 1112. The copper tube 1402 is threaded into the opening of the top lid 1112. A low outgassing epoxy may be applied to the threaded portion 1404 to improve the seal. The copper tube 1402 may be locked into place by threading a top locking nut 1408 and a bottom locking nut 1406 to the threaded portion 1404 on each side of the top lid 1112. This coupling can withstand a large amount of torque while maintaining a leak-free seal. Pinch off pliers designed for vacuum pinch-off may be used to pinch off the copper tube 1402.

Pinch-off hermetic sealing may be utilized for weight reduction, cost reduction and manufacturability. Aluminum has been an interest for pinch-off sealing, however it is difficult to pinch off due to the heavy native oxide layer that covers all aluminum. Only annealed aluminum can be pinched off hermetically. Additionally, it is difficult to weld the thin wall ¼" aluminum tubing to the tank lid as explained previously. Copper may be the best material for pinch-off hermetic sealing.

Alternative GIT interfaces are possible. For example, a brass fitting may be sealed into a detector lid using low outgassing epoxy. The ninety-degree flare on the brass fitting makes for a sizable area that can be attached to the aluminum lid making a reliable seal. A copper tube can be easily attached to the brass fitting using common copper/brass welding techniques. It may be more convenient to flare copper tubing to ninety degrees and without the use of the brass fitting. Copper flaring equipment may make the process more efficient.

With the insert assembled, the lids (top and bottom) can be pressed into place simultaneously using a hydraulic press. The entire detector tank with the lids in place may be placed in a hydraulic press, equipped in a glove box or in dry room atmosphere, and the top and bottom lids may be pressed into the tank approximately ⅛". The joint may then be backfilled with a low-outgassing epoxy (e.g., Torr Seal®) around the edges of the lid/tank joints to ensure a leak-free seal. The epoxy may be allowed to cure for approximately an hour and, at that time, the seal can be exposed to vacuum pressures.

The Li Foil MWPC device may be connected to a vacuum system capable of achieving pressures down to $10^{-7}$ Torr. After being evacuated down to turbo pump pressure, the device may be placed in a bake-out oven set between 100 and 115° C. The device can continue to be evacuated and baked out overnight. Later, the devices may be removed from the oven while remaining under dynamic vacuum. Once the device has cooled to room temperature, the vacuum can be removed, and the device may be slowly backfilled with 10 psi of high-purity argon. The device may be filled with a mixture of argon gas and another noble gas. The device may be filled with a mixture of argon gas and helium-3. The This device pressure was selected for the relatively high stopping power of the energetic reaction products resulting from a neutron interaction. This leads to a relatively large signal to noise ratio of the output signal while 10 psi also does not require an excessive amount of applied voltage to the device to not only sweep out the charge but also have relatively fast charge collection. Lastly, with the device at 10 psi pressure, the device can be permanently sealed by pinching off the gas interface tube using a set of pinch-off pliers.

In some configuration, the electrical feedthrough may be a bare wire for a solder connection to the electronics package. In such configurations, the lid area may be b backfilled with a dielectric potting compound. For example, 3M DP270 is an affordable and easy to mix potting compound that easily holds up to 500 volts applied at the electrical feed-though. Threaded rods may be placed into the top of the lid where the electronics package mounts onto, then the area may be backfilled with the 2-part epoxy and allowed to cure.

Figure 29:
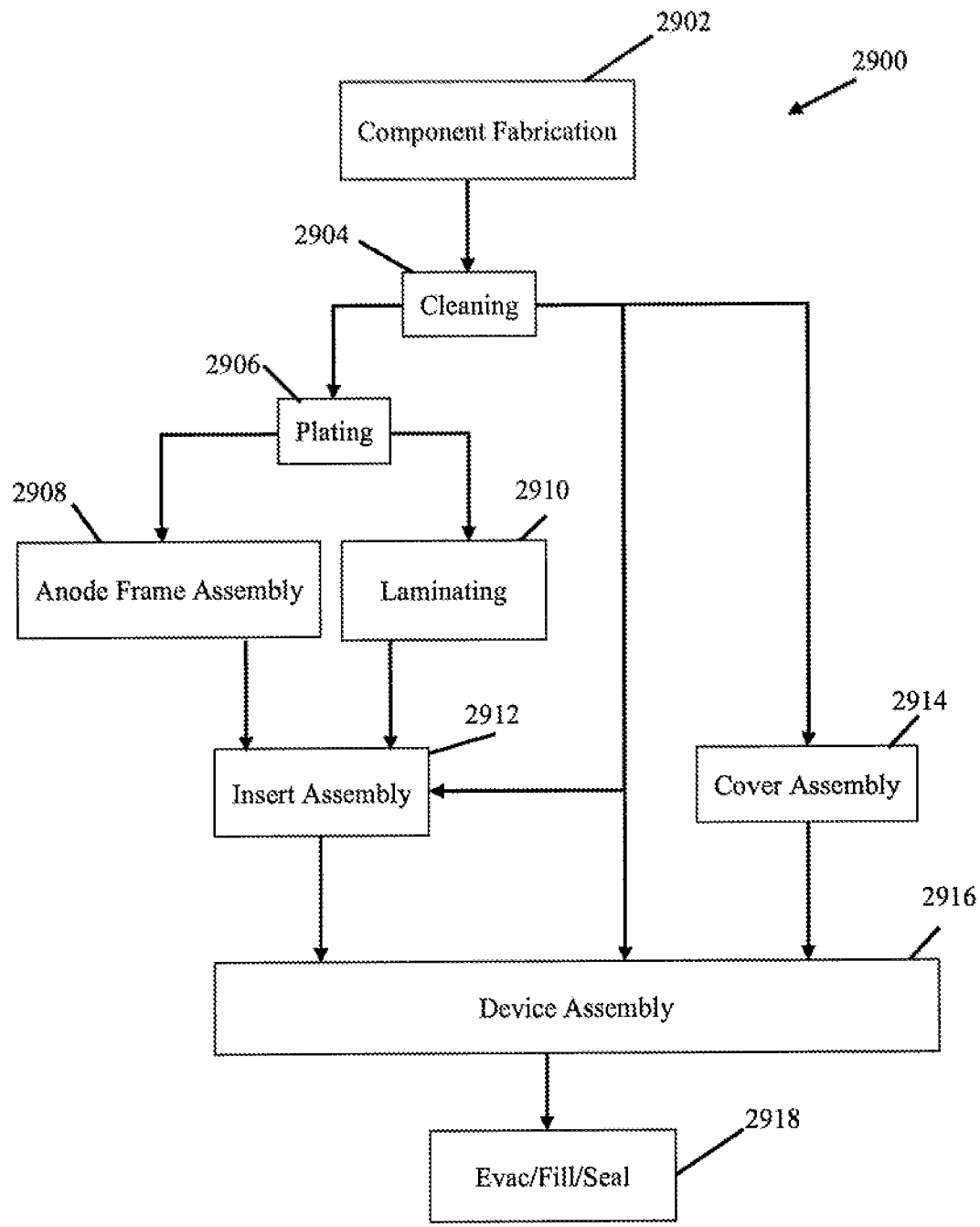
FIG. 29: Illustration of system for constructing a neutron device.

FIG. 29 depicts a possible system 2900 for constructing a neutron detector. The elements described as part of the system 2900 may include any equipment and processes for achieving the results. Component fabrication elements 2902 include those devices used for constructing the components of the neutron detector. For example, the component fabrication elements 2902 may include equipment and machinery used for constructing the various components. For example, equipment used for forming the tank and covers may be included in the component fabrication elements 2902. The component fabrication elements 2902 may include equipment for forming the anode frames and the windowed frames. For example, the component fabrication elements 2902 may include drills, saws, lathes, and other metal shaping equipment. The component fabrication elements 2902 may include metal casting equipment and processes. The component fabrication elements 2902 may include any metal joining equipment and processes (e.g., welding equipment). The output from the component fabrication elements 2902 may include the basic components for constructing the neutron detector including, for example, the anode frames, anode wires, neutron-sensitive foil, ferrules, metal and insulating tubing.

Cleaning elements 2904 may include those elements for cleaning the components as described above. The cleaning elements 2904 may include equipment for sonication baths in a variety of solvents. The cleaning elements 2904 may include equipment for scrubbing and rinsing the components. The cleaning elements 2904 may include any containers for soaking the components. The cleaning elements 2904 may be used to implement the above-described cleaning processes.

The plating elements 2906 may include those devices and processes used for plating the aluminum components such as the anode frames and the windowed frame. The plating process may include metals such as nickel, tin, gold, platinum, palladium, silver, and copper. Components may be plated with a suitable metal that does not react with the neutron-sensitive material. For example, the plating elements 2906 may include equipment and processes for electroplating the aluminum components. The output of the plating elements 2906 may include the plated components described above.

The anode frame assembly elements 2908 may include equipment for assembling the anode frame. For example, the anode frame assembly elements 2908 may include an anode frame assembly device that includes a tensioning device as described above with reference to FIG. 23 and FIG. 24. The anode frame assembly device may also include a holding element configured to hold an anode frame in a predetermined position and permit passage of an anode wire that is secured at a first side of the anode frame to a tensioning element. The tensioning element may be configured to apply a predetermined tension to the anode wire. The anode frame assembly elements 2908 may include equipment for applying and curing the low outgassing epoxy for bonding components to the anode frame. The anode frame assembly elements 2908 may include a crimping device configured to crimp the anode wire to a retaining element at a second side of the anode frame. The anode frame assembly device may define a channel for positioning the crimping device at a predetermined position and to prevent movement of the crimping device during tensioning. The predetermined position may be such that a pressure application point of the crimping device is positioned at the retaining element. The output from the anode frame assembly elements 2908 may be fully assembled anode frames.

The laminating elements 2910 may include a laminator that is configured to accept a first layer of Teflon, a foil of neutron-responsive material, a plated aluminum frame and a second layer of Teflon, and apply a predetermined temperature and predetermined pressure to laminate the foil to the plated aluminum frame. The lamination process may be performed as described above. The output of the laminating elements 2910 may be the frames defining a plurality of windows laminated with the neutron-sensitive foil.

The insert assembly elements 2912 may include equipment used for assembling the neutron detector insert. The insert assembly elements 2912 may include for aligning and fastening the anode frames and laminated frames into stacks. The insert assembly elements 2912 may include equipment and materials used for electrically connecting the anode wires together (e.g., crimping tool and/or soldering equipment). The output of the insert assembly elements 2912 may be the alternately stacked anode frames and laminated frames that are ready for insertion into the containment tank.

The cover assembly elements 2914 may include equipment and methods used for assembling the cover or top lid. The cover assembly elements 2914 may include equipment used for coupling the electrical connector and gas tube to the top cover. For example, the cover assemble elements 2914 may include equipment used for installing the threaded gas tube into the threaded opening. The cover assembly elements 2914 may include equipment and methods for installing and curing the low outgassing epoxy. The output of the cover assembly elements 2914 may be the assembled covers.

The device assembly elements 2916 may include equipment and processes used for the final device assembly. For example, the device assembly elements 2916 may include equipment and materials used for inserting the detector insert into the tank and securing the covers. The device assembly elements 2916 may include a hydraulic press that is configured to apply a predetermined pressure through a stand-off element to the top cover with tapered sides to cause the top cover to press into the detector housing. The stand-off element may define cavities to receive the gas tube and the electrical connector that are coupled to the top cover. The device assembly elements 2916 may further include any equipment for electrically connecting the anode wires to the electrical connector (e.g., soldering iron, solder) prior to pressing the top cover. The device assembly elements 2916 may include equipment and materials for sealing the tank. For example, the device assembly elements 2916 may include a laser welder for sealing the top cover to the detector tank. The device assembly elements 2916 may also include equipment and processes for installing and curing low outgassing epoxy (e.g., for sealing the covers). The output of the device assembly elements 2916 may be the assembled detector assembly without the gas.

The evacuation, fill and sealing elements 2918 may include equipment for evacuating and filling the detector tank after assembly. The evac/fill/seal elements 2918 may include a vacuum pump for removing air from the assembled tank. The evac/fill/seal elements 2918 may include a pump for filling the detector tank with an argon gas to a predetermined pressure (e.g., 10 psi). The detector tank may be filled with a mixture of argon gas and another noble gas. The detector tank may be filled with a mixture of argon gas and helium-3. The evac/fill/seal elements 2918 may include a pressure sensor/gauge to display the pressure of argon gas. The evac/fill/seal elements 2918 may include pinch-off pliers designed for vacuum pinch-off application for pinch sealing the gas tube after the tank is filled to the predetermined pressure.

The elements of the system 2900 may be enclosed in a dry room or glove box to prevent contamination of the device. The dry room or glove box may be configured to provide an environment having a Dew point less than minus 40° C.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a neutron detector, the method comprising:
   laminating a foil of neutron-responsive material to a frame including a plurality of supports that define a plurality of windows such that the foil completely covers the windows and is exposed on both sides of the frame to form a laminated frame assembly for placement into a radiation detector filled with a detector gas wherein the neutron-responsive material is responsive to neutrons absorbed thereby releasing substantially all reaction products into the detector gas on both sides of the foil which covers the windows.

2. The method of claim 1, wherein the neutron-responsive material is lithium.

3. The method of claim 1, wherein the frame is plated with a metal that does not chemically react with the neutron-responsive material and wherein the metal is one of nickel, gold, platinum, palladium, silver, tin, and copper.

4. The method of claim 1, wherein the laminating is performed in an environment having Dew point less than minus 40° C.

5. The method of claim 1, wherein the foil includes a plastic covering on one side of the foil, and the step of laminating includes inserting a first layer of Teflon adjacent the aluminum frame and a second layer of Teflon adjacent the plastic covering.

6. The method of claim 1, wherein the laminating is at a temperature between 50° C. and 120° C.

7. An apparatus for detecting neutrons, the apparatus comprising:
- a detector housing defining a chamber to retain a detector gas;
- a plurality of laminated frames comprising a frame including a plurality of supports defining a plurality of windows to which a foil of neutron-responsive material is laminated, wherein the frame is plated with a metal that does not react with the neutron-responsive material and wherein the foil completely covers the windows and wherein the neutron-responsive material is responsive to neutrons absorbed thereby releasing substantially all reaction products into the chamber on both sides of the foil which covers the windows;
- a plurality of anode frames, each including an anode wire that is coupled to a first electrically-insulated retaining element at a first side of the anode frame and spans across to a second side of the anode frame and through a second electrically-insulated retaining element;
- a detector insert formed by arranging the anode frames and the laminated frames in an alternating stack and inserted into the chamber of the detector housing;
- a cover having tapered sides and pressed into an open end defined by the detector housing;
- an electrical connector coupled to the cover and having a first connection to which each anode wire is electrically connected; and
- a tube passing through an opening defined in the cover and configured to be pinched off for sealing after inserting the detector gas through the tube.

8. The apparatus of claim 7 further comprising a layer of low outgassing epoxy installed at an interface between the cover and the detector housing.

9. The apparatus of claim 7 wherein the cover is laser welded to the detector housing.

10. The apparatus of claim 7 wherein the detector gas is argon gas.

11. The apparatus of claim 7 wherein the detector gas is a mixture of argon gas and another noble gas.

12. The apparatus of claim 7 wherein the detector gas is a mixture of argon gas and helium-3 gas.

13. The apparatus of claim 7 wherein the opening and the tube are threaded and the tube is threaded into the opening.

14. The apparatus of claim 13 further comprising a layer of low outgassing epoxy installed between the opening and the tube.

15. The apparatus of claim 7, wherein the first electrically-insulated retaining element includes a rivet nut and an insulating tube that is inserted in a passage defined by the anode frame and wherein the insulating tube is fixed within the passage with a low outgassing epoxy.

16. The apparatus of claim 15 wherein the rivet nut is crimped to an end of the anode wire and an opposite end of the anode wire is passed through the insulating tube to the second electrically-insulated retaining element.

17. The apparatus of claim 7, wherein the second electrically-insulated retaining element includes an insulating tube, a first conductive tube and a second conductive tube, and the insulating tube is fixed into a passage defined by the anode frame using a low outgassing epoxy, and the first conductive tube is fixed to the insulating tube using a low outgassing epoxy, and the anode wire is crimped to the second conductive tube.

18. The apparatus of claim 17 wherein the first conductive tube and the second conductive tube are crimped together while the anode wire is tensioned to a predetermined tension.

19. The apparatus as claimed in claim 7, wherein the anode frame are plated with a metal that does not chemically react with the neutron-reactive material and wherein the metal is one of nickel, gold, platinum, palladium, silver, tin and copper.

20. A system for constructing a neutron detector, the system comprising:
- an anode frame assembly device including a holding element configured to hold an anode frame in a predetermined position and permit passage of an anode wire that is secured at a first side of the anode frame to a tensioning element, wherein the tensioning element is configured to apply a predetermined tension to the anode wire; and
- a laminating device configured to apply a predetermined temperature and pressure to laminate a foil of neutron-responsive material to an aluminum frame having windows so that the foil completely covers the windows.

21. The system of claim 20 further comprising a crimping device configured to crimp the anode wire to a retaining element at a second side of the anode frame, wherein the anode frame assembly device defines a channel for positioning the crimping device at a predetermined position and to prevent movement of the crimping device during tensioning.

22. The system of claim 20 wherein the predetermined tension is between 1 and 5 oz.

23. The system of claim 20 wherein the tensioning element includes a predetermined weight that is attachable to an end of the anode wire.

24. The system of claim 23 wherein the tensioning element includes a push/pull gauge to which the anode wire is attachable and wherein the push/pull gauge is coupled to a threaded rod for moving the push/pull gauge relative to the holding element to adjust tension of the anode wire.

25. The system of claim 20 wherein the laminating device is configured to accept a first layer of Teflon, the foil of neutron-responsive material, the aluminum frame and a second layer of Teflon, and apply the predetermined temperature and the predetermined pressure to laminate the foil to the aluminum frame.

26. The system of claim 25, wherein the predetermined temperature is a temperature between 50° C. and 120° C.

27. The system of claim 20 further comprising a hydraulic press configured to apply a predetermined pressure through a stand-off element to a top lid with tapered sides to cause the top lid to press into a detector housing, wherein the stand-off element defines cavities to receive a gas tube and an electrical connector that are coupled to the top lid.

* * * * *